US011092983B2

(12) United States Patent
Cybulsky et al.

(10) Patent No.: US 11,092,983 B2
(45) Date of Patent: Aug. 17, 2021

(54) SYSTEM CONTROL BASED ON ACOUSTIC AND IMAGE SIGNALS

(71) Applicant: Rolls-Royce Corporation, Indianapolis, IN (US)

(72) Inventors: Michael Cybulsky, Indianapolis, IN (US); Taylor K. Blair, Indianapolis, IN (US); Benjamin Zimmerman, Moseley, VA (US); Marshall Louis Sweet, Midlothian, VA (US); Andrea Marcon, Richmond, VA (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/441,375

(22) Filed: Jun. 14, 2019

(65) Prior Publication Data
US 2019/0384329 A1 Dec. 19, 2019

Related U.S. Application Data

(60) Provisional application No. 62/686,390, filed on Jun. 18, 2018.

(51) Int. Cl.
G05D 7/06 (2006.01)
G05B 13/02 (2006.01)
(Continued)

(52) U.S. Cl.
CPC ......... *G05D 7/0635* (2013.01); *G05B 13/024* (2013.01); *G05B 13/0265* (2013.01);
(Continued)

(58) Field of Classification Search
CPC ....... B05B 12/082; B05B 12/08; B05B 1/002; G05B 13/024; G05B 2219/49065;
(Continued)

(56) References Cited

U.S. PATENT DOCUMENTS 2,099,074 A 11/1937 Mueller et al.
2,361,458 A 10/1944 Converse
(Continued)

FOREIGN PATENT DOCUMENTS

DE 102015109873 A1 12/2016
EP 0481382 A1 4/1992
(Continued)

OTHER PUBLICATIONS

S. Adams, G. Crannell, A. Bolcavage, R. McIntyre and P. A. Beling, "A Condition Monitoring System for Low Vacuum Plasma Spray using Computer Vision," 2018 IEEE International Conference on Prognostics and Health Management (ICPHM), Seattle, WA, 2018, pp. 1-7, doi: 10.1109/ICPHM.2018.8448464. (Year: 2018).*
(Continued)

*Primary Examiner* — Chad G Erdman
(74) *Attorney, Agent, or Firm* — Shumaker & Sieffert, P.A.

(57) ABSTRACT

An example system includes at least one acoustic sensor and one optical sensor to monitor a thermal spray system controlled by a plurality of control parameters and performing a process associated with a plurality of process outputs. The system includes a computing device including a machine learning module and a control module. The machine learning module is configured to determine, based on at least the plurality of control parameters, an at least one time-dependent acoustic data signal, an at least one image data signal, and the plurality of process outputs, a relationship between the plurality of control parameters and the plurality of process outputs by machine learning. The control module is configured to control the thermal spray system to adjust the plurality of process outputs toward a plurality of respective operating ranges.

20 Claims, 10 Drawing Sheets

(51) Int. Cl.
*C23C 4/134* (2016.01)
*G05D 16/20* (2006.01)
*G05D 23/19* (2006.01)

(52) U.S. Cl.
CPC ............. *C23C 4/134* (2016.01); *G05D 16/20* (2013.01); *G05D 23/19* (2013.01)

(58) Field of Classification Search
CPC ...... G05B 2219/45013; G05B 13/0265; G05B 13/02; G05D 7/0635; G05D 16/20; G05D 23/19; G05D 7/06; C23C 4/134
See application file for complete search history.

(56) References Cited

U.S. PATENT DOCUMENTS

| | | |
|---|---|---|
| 3,580,092 A | 5/1971 | Scarpa |
| 4,550,615 A | 11/1985 | Grant |
| 4,586,386 A | 5/1986 | Hollstein et al. |
| 4,613,259 A | 9/1986 | Packer et al. |
| 4,621,519 A | 11/1986 | Phillips |
| 4,811,605 A | 3/1989 | Nadeau et al. |
| 4,850,229 A | 7/1989 | Phillips |
| 4,856,321 A | 8/1989 | Smalling et al. |
| 4,905,897 A | 3/1990 | Rogers et al. |
| 5,014,447 A | 5/1991 | Hagen |
| 5,101,774 A | 4/1992 | Marziale et al. |
| 5,180,921 A | 1/1993 | Moreau et al. |
| 5,455,868 A | 10/1995 | Sergent et al. |
| 5,654,797 A | 8/1997 | Moreau et al. |
| 5,757,498 A | 5/1998 | Klein, II et al. |
| 5,912,471 A | 6/1999 | Schutz |
| 5,928,731 A | 7/1999 | Yanagida et al. |
| 5,986,277 A | 11/1999 | Bourque et al. |
| 6,014,447 A | 1/2000 | Kohnen et al. |
| 6,185,153 B1 | 2/2001 | Hynes et al. |
| 6,437,694 B1 | 8/2002 | Lee |
| 6,438,239 B1 | 8/2002 | Kuchen |
| 6,507,023 B1 | 1/2003 | Parham et al. |
| 6,684,702 B2 | 2/2004 | Ziada |
| 6,853,951 B2 | 2/2005 | Jarrell et al. |
| 6,940,409 B1 | 9/2005 | Green |
| 6,988,857 B2 | 1/2006 | Kroemmer et al. |
| 7,034,244 B2 | 4/2006 | Matus |
| 7,043,069 B1 | 5/2006 | Heinrich et al. |
| 7,114,889 B2 | 10/2006 | Kanou et al. |
| 7,278,294 B2 | 10/2007 | Giles et al. |
| 7,290,450 B2 | 11/2007 | Brown et al. |
| 7,311,004 B2 | 12/2007 | Giles |
| 7,389,278 B2 | 6/2008 | Unsworth et al. |
| 7,499,836 B1 | 3/2009 | Mooney |
| 7,665,348 B2 | 2/2010 | Giles |
| 7,802,687 B2 | 9/2010 | Fritz et al. |
| 7,881,884 B2 | 2/2011 | Perry et al. |
| 7,891,315 B2 | 2/2011 | Barbezat |
| 8,121,588 B2 | 2/2012 | Gottlieb |
| 8,193,942 B2 | 6/2012 | White et al. |
| 8,231,310 B2 | 7/2012 | Sanwald |
| 8,250,907 B2 | 8/2012 | Giles |
| 8,510,014 B2 | 8/2013 | Nomura et al. |
| 8,542,124 B2 | 9/2013 | Timm |
| 9,056,368 B2* | 6/2015 | Stork Genannt Wersborg ............ B23K 26/02 |
| 9,062,682 B2 | 6/2015 | Loose et al. |
| 9,099,074 B1 | 8/2015 | Lucon et al. |
| 9,709,466 B2 | 7/2017 | Kwon et al. |
| 10,240,091 B2 | 3/2019 | Cybulsky et al. |
| 10,241,091 B2 | 3/2019 | Cybulsky et al. |
| 10,274,364 B2 | 4/2019 | Blair et al. |
| 2002/0153117 A1 | 10/2002 | Allor et al. |
| 2003/0087040 A1 | 5/2003 | Ladentin |
| 2004/0030524 A1 | 2/2004 | Jarrell et al. |
| 2005/0011278 A1 | 1/2005 | Brown et al. |
| 2005/0041238 A1 | 2/2005 | Ludviksson et al. |
| 2005/0241761 A1 | 11/2005 | Kannan et al. |
| 2006/0071666 A1 | 4/2006 | Unsworth et al. |
| 2007/0044572 A1 | 3/2007 | Davis et al. |
| 2007/0264439 A1 | 11/2007 | Abdullahi et al. |
| 2007/0279235 A1 | 12/2007 | Davis et al. |
| 2008/0184793 A1 | 8/2008 | Mauchle et al. |
| 2008/0189057 A1 | 8/2008 | Perry et al. |
| 2009/0068978 A1 | 3/2009 | Gottlieb |
| 2010/0071616 A1 | 3/2010 | Mauchle et al. |
| 2010/0132439 A1 | 6/2010 | Giles |
| 2011/0005420 A1 | 1/2011 | Fullerton |
| 2011/0118998 A1 | 5/2011 | Loose et al. |
| 2011/0308812 A1 | 12/2011 | Bullen |
| 2012/0037074 A1 | 2/2012 | Outland |
| 2012/0125592 A1* | 5/2012 | Fadell ............... G05B 15/02 165/201 |
| 2013/0067992 A1 | 3/2013 | Sinha et al. |
| 2013/0243535 A1 | 9/2013 | Volonte et al. |
| 2014/0010968 A1 | 1/2014 | Prest et al. |
| 2014/0072125 A1 | 3/2014 | Cohn et al. |
| 2014/0113840 A1 | 4/2014 | Margalit et al. |
| 2014/0200837 A1 | 7/2014 | Blair et al. |
| 2015/0362418 A1 | 12/2015 | Newton et al. |
| 2016/0354796 A1* | 6/2016 | Cybulsky ............ B05B 12/008 |
| 2016/0223496 A1 | 8/2016 | Klos et al. |
| 2016/0356747 A1 | 12/2016 | Cybulksy et al. |
| 2018/0149634 A1* | 1/2018 | Dattilo ............... G01N 33/32 |
| 2018/0154377 A1 | 6/2018 | Blair et al. |
| 2018/0185867 A1* | 7/2018 | Klimesch ............ B05B 12/004 |

FOREIGN PATENT DOCUMENTS

| | | |
|---|---|---|
| EP | 1036856 A1 | 9/2000 |
| EP | 1205748 A1 | 5/2002 |
| EP | 1336841 A2 | 8/2003 |
| EP | 3128321 A1 | 2/2017 |
| WO | 2005085489 A1 | 9/2005 |
| WO | 2014110486 A1 | 7/2014 |
| WO | 2016172316 A1 | 10/2016 |

OTHER PUBLICATIONS

Notice of Allowance from U.S. Appl. No. 15/833,546 dated Feb. 26, 2020, 5 pgs.
Communication under Rule 71(3) EPC, from counterpart European Application No. 17205554.3, dated May 17, 2019, 54 pp.
Braeuel et al., "An Acoustic Method for the Detection of Defects in the Nozzle of Plasma Cutting Torches," IEEE Transactions on Ultrasonics, Ferroelectrics, and Frequency Control, Mar. 1987, 4 pp.
Extended Search Report from counterpart European Application No. 17205554.3, dated May 24, 2018, 8 pp.
Faisal et al., "Application of acoustic emission for monitoring the HVOF thermal spraying process," 27th European Working Group on Acoustic Emission, Sep. 21, 2006, 15 pp.
Hou et al., "Acoustic Monitoring of Hydrocyclone Performance," Minerals Engineering, vol. 11, No. 11, Sep. 1998, pp. 1047-1059.
Kanta et al., "Artificial Neural Networks vs. Fuzzy Logic: Simple Tools to Predict and Control Complex Processes—application to Plasma Spray Processes," Journal of Thermal Spray Technology, vol. 17, No. 3, Sep. 2008, pp. 365-376.
Kovacevic et al., "On-line monitoring of the electric arc-spraying process based on acoustic signatures," Journal of Engineering Manufacture, vol. 209, Oct. 1, 1995, 11 pp.
Leblanc et al., "Long Term Stability of Plasma Spraying: Study of the Evolution of the In-Flight Particle State Coating Microstructure, Voltage and Acoustic Signatures," In Tagungsband Conference Proceedings., Journal of Thermal Spray Technology, vol. 11 (3), Sep. 2002, 7 pp.
Lenain et al., "New Approaches of the Forecast of the Aging of Plasma Jet Nozzle in Industrial Settings of Thermal Spraying," University of Limoges, https://hal.archives-ouvertes.fr/hal-00609693, Sep. 23, 2011, 20 pp.
Rat et al., "Acoustic signature analysis of the interaction between a dc plasma jet and a suspension liquid jet," Journal of Physics D: Applied Physics, Sep. 18, 2009, 13 pp.

(56) References Cited

OTHER PUBLICATIONS

Read, International Thermal Spray Association, Keynote address, China International Thermal Spray Conference and the 16th National Thermal Spraying Seminar, Dalian, China, Sep. 22-25, 2003, 68 pp.
Response to Extended Search Report dated May 24, 2018, from counterpart European Application No. 17205554.3, filed Dec. 10, 2018, 33 pp.
Rigot, "Contribution of the study of the electrode erosion in dc plasma spray torches through the on-line following of voltage and sound signals," Nov. 2003 University of Limoges, 3 pp.
U.S. Appl. No. 15/833,546, filed Dec. 6, 2017, by Blair et al.
U.S. Appl. No. 15/172,362, filed by Cybulsky et al. on Jun. 3, 2016.
U.S. Appl. No. 15/172,441, filed by Cybulsky et al. on Jun. 3, 2016.
U.S. Appl. No. 61/752,083 by Blair et al., entitled "Analysis of Component Having Engineered Internal Space for Fluid Flow," filed Jan. 14, 2013.
Umeda et al., "On the sound sources of screech tones radiated from choked circular jets", The Journal of the Acoustical Society of America, vol. 110, No. 4, Oct. 2001, 14 pp.
Xi, et al., "Monitoring of Nozzle Wear during Plasma Spray," Thermal Spray 1997: A United Forum for Scientific and Technological Advances, ASM International., Sep. 15-18, 1997.
Office Action from U.S. Appl. No. 15/833,546, dated Mar. 20, 2019, 30 pp.
Extended Search from counterpart European Application No. 19178692.0 dated Nov. 19, 2019, 10 pp.
Adams et al., "A Condition Monitoring System for Low Vacuum Plasma Spray using Computer Vision", 2018 IEEE International Conference on Prognostics and Health Management (ICPHM), Sep. 2018, 7 pgs.
Response to Office Action dated Sep. 11, 2019, from U.S. Appl. No. 15/833,546, filed Dec. 11, 2019 13 pp.
Office Action from U.S. Appl. No. 15/833,546, dated Sep. 11, 2019, 12 pp.
Blair, "Development of a Plasma Spray Process Monitoring System through Aeroacoustic Signal Analysis", Feb. 17, 2015, 157 pgs.
Response to the Extended Search from counterpart European Application No. 19178692.0 dated Nov. 19, 2019, filed Jun. 12, 2020, 30 pp.

\* cited by examiner

SYSTEM CONTROL BASED ON ACOUSTIC AND IMAGE SIGNALS

This application claims the benefit of U.S. Provisional Application No. 62/686,390 filed Jun. 18, 2018, which is incorporated herein by reference in its entirety.

TECHNICAL FIELD

The disclosure relates to controlling systems based on acoustic and image signals.

BACKGROUND

Thermal spray systems are used in a wide variety of industrial applications to coat targets with coating material to modify or improve the properties of the target surface. Coatings may include thermal barrier coatings, wear resistant coatings, ablative coatings, or the like. Thermal spray systems use heat generated electrically, by plasma, or by combustion to heat material injected in a plume, so that molten material propelled by the plume contacts the surface of the target. Upon impact, the molten material adheres solidifies and to the target surface, resulting in a coating.

SUMMARY

In some examples, the disclosure describes a system. The system includes at least one acoustic sensor configured to generate at least one time-dependent acoustic data signal indicative of sound generated by a thermal spray system controlled by a plurality of control parameters and performing a process associated with a plurality of process outputs. The system includes at least one optical sensor configured to generate at least one image data signal indicative of the thermal spray system performing the process. The system also includes a computing device. The computing device includes a machine learning module configured to determine, based on at least the plurality of control parameters, the at least one time-dependent acoustic data signal, the at least one image data signal, and the plurality of process outputs, a relationship between the plurality of control parameters and the plurality of process outputs by machine learning. The computing device includes a control module configured to determine, based on the relationship determined by the machine learning module, respective values of the plurality of control parameters configured to cause the thermal spray system to generate predetermined values of the plurality of process outputs. The control module is configured to control, based on the respective values of the plurality of control parameters, the thermal spray system to adjust the plurality of process outputs toward a plurality of respective operating ranges by sending a control signal to the thermal spray system.

In some examples, the disclosure describes a technique. The technique includes receiving, by a computing device, from at least one acoustic sensor, at least one time-dependent acoustic data signal indicative of sound generated by a thermal spray system controlled by a plurality of control parameters and performing a process associated with a plurality of process outputs. The technique includes receiving, by the computing device, from at least one optical sensor, at least one image indicative of the thermal spray system performing the process. The technique also includes determining, by the computing device, based on at least the plurality of control parameters, the at least one time-dependent acoustic data signal, the at least one image data signal, and the plurality of process outputs, a relationship between the plurality of control parameters and the plurality of process outputs by machine learning. The technique includes determining, by the computing device, based on the relationship, respective values of the plurality of control parameters configured to cause the thermal spray system to generate predetermined values of the plurality of process outputs. The technique includes controlling, by the computing device, based on the respective values of the plurality of control parameters, the thermal spray system to adjust the plurality of process outputs toward a plurality of respective operating ranges by sending a control signal to thermal spray system.

In some examples, the disclosure describes a non-transitory computer readable storage medium comprising instructions that, when executed, cause at least one processor to receive, from at least one acoustic sensor, at least one time-dependent acoustic data signal indicative of sound generated by a thermal spray system controlled by a plurality of control parameters and performing a process associated with a plurality of process outputs. The instructions, when executed, cause the at least one processor to receive, from at least one optical sensor, at least one image data signal indicative of the thermal spray system performing the process. The instructions, when executed, cause the at least one processor to determine, based on at least the plurality of control parameters, the at least one time-dependent acoustic data signal, the at least one image data signal, and the plurality of process outputs, a relationship between the plurality of control parameters and the plurality of process outputs by machine learning. The instructions, when executed, cause the at least one processor to determine, based on the relationship, respective values of the plurality of control parameters configured to cause the thermal spray system to generate predetermined values of the plurality of process outputs. The instructions, when executed, cause the at least one processor to control, based on the respective values of the plurality of control parameters, the thermal spray system to adjust the plurality of process outputs toward a plurality of respective operating ranges by sending a control signal to thermal spray system.

The details of one or more examples are set forth in the accompanying drawings and the description below. Other features, objects, and advantages will be apparent from the description and drawings, and from the claims.

DETAILED DESCRIPTION

Figure 1:
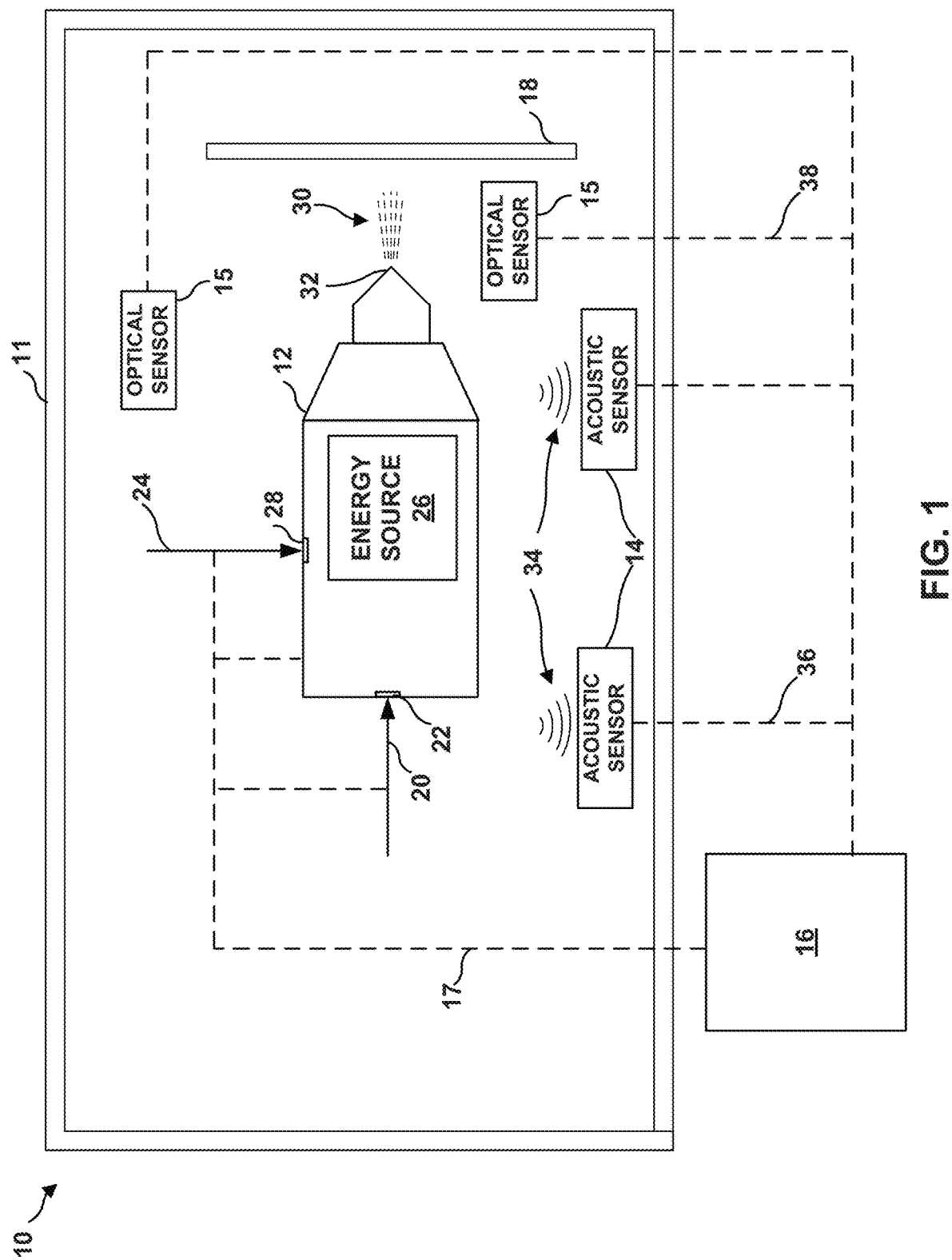
FIG. 1 is a conceptual block diagram illustrating an example thermal spray system performing a process and including a computing device for controlling the process by adjusting a process attribute in response to an acoustic signal and an optical signal generated by the thermal spray system.

The disclosure describes systems and techniques for controlling a thermal spray system using machine learning to monitor or adjust a plurality of process outputs in response to an acoustic signal generated by the thermal spray system and an image indicative of the thermal spray system. The thermal spray system may include at least one system component, such as a spray gun, a powder feed system, a gas feed system, or like. During a thermal spray process, the spray gun receives spray material and a carrier gas, at least partially melts the spray material, and directs the at least partially melted spray material toward a spray target using the plasma plume of the carrier gas. The at least partially melted spray material contacts the spray target to coat the spray material on the spray target. The plurality of process outputs may include coating characteristics, for example, a coating microstructure, a coating hardness, a coating adhesion, a coating deposition rate, a coating deposition efficiency, a coating color, a coating porosity, thickness per pass, coating hardness, a coating density, or a coating quality (e.g., a comparison of a coating quality to an ideal coating quality). In some examples, the quality of the coating on the spray target may ultimately depend on a plurality of process control parameters for instance, including a primary gas flow rate, a secondary gas flow rate, a gun current, a carrier gas flow rate, a powder feed rate, a temperature, a pressure, a mass flow rate, a volumetric flow rate, a molecular flow rate, a molar flow rate, a composition, a velocity, or a concentration, or combinations thereof. Unsatisfactory coating characteristics may result from variances in process control parameters, or other causes such as component wear.

Machine learning may be used to analyze the relatively large number of relationships between process control parameters and process outputs, for example, from previous runs, past epochs of a current run, from numerical models of systems, or from empirical data. Thus, machine learning may map process control parameters to process outputs, and the computing device may use such mapping to ultimately determine process control parameters that result in predetermined process outputs. The computing device may accordingly send one or more control signals to the thermal spray system to control process control parameters such that the thermal spray system ultimately produces coatings within predetermined specifications.

During operation, the thermal spray system may generate an acoustic signal (e.g., sound) associated with thermal spray parameters, which may be depend on process control parameters. The thermal spray system may include at least one acoustic sensor configured to generate at least one time-dependent acoustic data signal representative of sound generated by the thermal spray system. The system may additionally include at least one optical sensor configured to generate at least one image data signal indicative of the thermal spray system performing the process. For example, the image data signal may include one or both of visible components (for example, visible wavelength bands from about 380 manometers (nm) to about 740 nm) or invisible components (for example, infra-red wavelengths from about 700 nm to about 1,000 nm or ultraviolet wavelengths from about 10 nm to about 400 nm).

The system also may include a computing device configured to analyze the at least one time-dependent acoustic data signal and the image data signal, and ultimately control the thermal spray system to adjust the plurality of process outputs toward a plurality of respective operating ranges. For example, the computing device may use machine learning to analyze at least one of the acoustic data signal or the image date signal, and determine a relationship between the plurality of control parameters and the plurality of process outputs.

The time-dependent acoustic data signal may be rich in information, and may include data representative of sound generated by one or more component of the thermal spray system or the thermal spray system as a whole. The image data signal may include data representative of a status of one or more component of the thermal spray system or the thermal spray system as a whole. The acoustic or image data signals may also be representative of process attributes or variations in process attributes. For example, a sound generated by the spray gun may depend upon process attributes including, for example, geometry of the spray gun nozzle, including wear of the spray gun nozzle; powder flow rate; powder flow pulsing; gas flow rate; powder composition; or the like. Similarly, an image of the thermal spray system may be indicative of status of the system or system components, for example, a thermal plume generated by the system. For example, infrared image data may be indicative of temperature along the length of a plasma plume or another flow stream of a thermal spray system. The temperature of the plume or flow stream may significantly impact the quality of the coating. If the plume is too hot, the coating particles can vaporize before striking the component to be coated. Conversely, if the plume temperature is too cold, the particles can be solid and bounce off the target to be coated. The temperature of the plume or flow stream may be determined from image data, for example, in one or both of the visible or infrared spectrum. For example, a plume or flow stream may be imaged, and a hottest region of the plume or flowstream may be determined from the image. Further, the temperature or the thermal profile of one or more regions of the plume or flowstream may also be determined from the image.

Thus, the acoustic or image data signals may also be indicative of a plurality of process outputs, for example, one or more coating properties or characteristics. In this way, the computing device may analyze the time-dependent acoustic data signal and image data system to determine, based on the relationship determined by a machine learning module, respective values of the plurality of control parameters configured to cause the thermal spray system to generate predetermined values of the plurality of process outputs. The computing device then may control, based on the respective values of the plurality of control parameters, the thermal spray system to adjust the plurality of process outputs toward a plurality of respective operating ranges by sending a control signal to thermal spray system. In this way, the computing device may analyze the time-dependent acoustic data signals and/or image data signals to monitor one or more components of the thermal spray system, or the thermal spray system as a whole, and ultimately determine process control parameters for controlling thermal spray system by machine learning.

The computing device may control the thermal spray system by adjusting at least one process control parameter. In some examples, the computing device may adjust a plurality of control parameters by sending one or more control signals to the thermal spray system to cause a plurality of process outputs to be adjusted toward a plurality of output ranges. For example, the computing device may determine a control signal that controls at least one system component to cause process outputs to remain or be adjusted to be within respective nominal or expected ranges, or within a threshold amount of the expected values.

Thus, example systems and techniques according to the disclosure may be used to control thermal spray system to adjust or maintain process output within or toward a plurality of operating ranges, by using machine learning to determine, based on at least the plurality of control parameters, the frequency domain spectrum, the at least one image, and the plurality of process outputs, a relationship between the plurality of control parameters and the plurality of process outputs.

By utilizing the at least one time-dependent acoustic and image data signals and machine learning, the thermal spray system described herein may perform real-time or near real-time control of operation of at least one component of the thermal spray system. As used herein, near real-time refers to the time delay introduced, by automated data processing or transmission, between the occurrence of an event and the use of the processed data, such as for display or feedback and control purposes. Further, controlling the thermal spray system by monitoring a time-dependent acoustic data signal representative of one or more outputs of the thermal spray system and image data signal representative of the thermal spray system may provide a more accurate control of the thermal spray system, e.g., compared to controlling the thermal spray system by monitoring inputs to the thermal spray system using a flow meter, flow controller, amp meter, or voltmeter, as the acoustic signal may be representative of outputs of the thermal spray system. Further, in some examples, flow meters, flow controllers, amp meters, and voltmeters may require calibration, and falling out of calibration may reduce the accuracy of the feedback provided by out-of-calibration flow meters, flow controllers, amp meters, and voltmeters. Thus, systems and techniques according to the disclosure provide near real-time feedback to an operator or a process controller for controlling components of thermal spray systems to adjust process control parameters or process outputs, or to shut down the components or the system, as appropriate.

Further, conventional plasma spray coatings may be relatively difficult to control, and exhibit variations across different runs or cycles. For example, coatings sprayed at the same site, in the same booth, with the same parameters of convention spray systems may vary. Such variation may result from process variations and degradation of the equipment, such as electrodes, which may affect the plasma spray process, ultimately causing deviation of coating quality or characteristics. A component with a coating out of specification may need to be stripped and re-coated, increasing costs and delays. Such variations may result from the relatively large number of control parameters and complexity of the thermal spray process. Machine learning may be used to analyze the relatively large number of relationships between process control parameters and process outputs. Systems and techniques according to the disclosure may provide relatively better control, or maintain process outputs and coating characteristics within predetermined operating ranges, reducing costs and delays, and in an automated or semi-automated manner, reducing operator intervention.

FIG. 1 is a block diagram illustrating an example thermal spray system 10. In some examples, thermal spray system 10 includes components such as an enclosure 11, a thermal spray gun 12, at least one acoustic sensor 14, at least one optical sensor 15, and a computing device 16.

Enclosure 11 encloses some components of thermal spray system 10, including, for example, thermal spray gun 12 and at least one acoustic sensor 14. In some examples, enclosure 11 substantially completely surrounds thermal spray gun 12 and at least one acoustic sensor 14 and encloses an atmosphere. In some examples, thermal spray gun 12 may be mounted on a manipulating robot or machine controllable by thermal spray system 10 that enables control of the position of thermal spray gun 12 relative to spray target 18. The atmosphere may include, for example, air, an inert atmosphere, a vacuum, or the like. In some examples, the atmosphere may be selected based on the type (e.g., composition) of coating being applied using thermal spray system 10, the composition of spray target 18, or both. Enclosure 11 also encloses a spray target 18.

Spray target 18 includes a substrate to be coated using thermal spray system 10. In some examples, spray target 18 may include, for example, a substrate on which a bond coat, a primer coat, a hard coat, a wear-resistant coating, a thermal barrier coating, an abradable coating, an environmental barrier coating, or the like is to be deposited. Spray target 18 may include a substrate or body of any regular or irregular shape, geometry or configuration. In some examples, spray target 18 may include metal, plastic, glass, or the like. Spray target 18 may be a component used in any one or more mechanical systems, including, for example, a high temperature mechanical system such as a gas turbine engine. In some examples, spray target 18 may be mounted on a manipulating robot or machine controllable by thermal spray system 10 that enables control of the position of spray target 18 relative to thermal spray gun 12.

Thermal spray gun 12 is coupled to a gas feed line 20 via gas inlet port 22, is coupled to a material feed line 24 via material inlet port 28, and includes or is coupled to an energy source 26. Gas feed line 20 provides a gas flow to gas inlet port 22 of thermal spray gun 12. Depending upon the type of thermal spray process being performed, the gas flow may be a carrier gas for the coating material, may be a fuel that is ignited to at least partially melt the coating material, or both. In some examples, the carrier gas may include a power, primary and/or secondary gas. Gas feed line 20 may be coupled to a gas source (not shown) that is external to enclosure 11.

In some examples, thermal spray gun 12 also may include a material inlet port 28, which is coupled to material feed line 24. Material feed line 24 may be coupled to a material source (not shown) that is located external to enclosure 11. Coating material may be fed through material feed line 24 in powder form, and may mix with gas from gas feed line 20 within thermal spray gun 12. In some examples, gas feed line 20 may include a separate and/or dedicated gas source. In other examples, thermal spray gun 12 may omit material inlet port 28, and material feed line 24 may provide the coating material to exit flowstream 30 outside thermal spray gun 12 near outlet 32. The composition of the coating material may be based upon the composition of the coating to be deposited on spray target 18, and may include, for example, a metal, an alloy, a ceramic, or the like.

Thermal spray system 10 also includes energy source 26, which may be included in thermal spray gun 12 or may be separate from thermal spray gun 12. Energy source 26 provides energy to at least partially melt (e.g., partially melt or substantially fully melt) and/or accelerate the coating material provided through material inlet port 28. In some examples, energy source 26 includes a plasma electrode, which may energize gas provided through gas feed line 20 to form a plasma. The plasma at least partially melts the coating material. In other examples, energy source 26 may ignite gas provided through gas feed line 20 to at least partially melt the coating material (e.g., in high velocity oxy-fuel (HVOF) spray processes).

As shown in FIG. 1, exit flowstream 30 exits outlet 32 of thermal spray gun 12. In some examples, outlet 32 includes a spray gun nozzle. Exit flowstream 30 may include at least partially melted coating material carried by a carrier gas. Outlet 32 may be configured and positioned to direct the at least partially melted coating material at spray target 18.

Thermal spray system 10 includes at least one acoustic sensor 14. In some examples, the at least one sensor 14 may be mounted a manipulating robot or machine controllable by thermal spray system 10 one which thermal spray gun 12 is mounted, or may be mounted to enclosure 11. In some examples, as shown in FIG. 1, thermal spray system 10 includes a plurality of acoustic sensors 14, such as at least two acoustic sensors 14. Each of the at least one acoustic sensor 14 is configured to sense sound generated by thermal spray system 10. Sounds, for example, acoustic signals 34, may be generated by one or more components or processes of thermal spray system 10. The at least one acoustic sensor 14 may include, for example, an acoustic sensing element such as a microphone or a sound-to-electric transducer or electromagnetic, capacitive, or piezoelectric elements that generate an electrical signal in response to incident sound waves.

The at least one acoustic sensor 14 may be configured to sense acoustic signals 34 with a predetermined wavelength or wavelength range. In some examples, the at least one acoustic sensor 14 may be configured to sense acoustic signals 34 that may or may not be detectable by human hearing, including infrasound and ultrasound. In some examples, the at least one acoustic sensor 14 may be configured to sense acoustic signals 34 conducted through an atmosphere in enclosure 11 and/or a solid component of thermal spray system 10. In some examples, acoustic signals 34 may include frequencies below about 20 Hz, from about 20 Hz to about 20 kHz, from about 20 kHz to about 2 MHz, higher than about 2 MHz, or combinations thereof.

Each acoustic sensor of the at least one acoustic sensor 14 is configured to generate a respective time-dependent acoustic data signal of at least one time-dependent acoustic data signal 36 based on the sensed acoustic signal 34 and communicate at least one time-dependent acoustic data signal 36 to computing device 16. In some examples, at least one time-dependent acoustic data signal 36 includes a digital data signal, and at least one acoustic sensor 14 includes an analog-to-digital converter. In other examples, at least one time-dependent acoustic data signal 36 may include an analog signal. In some examples, at least one acoustic sensor 14 may include an amplifier to amplify the signal sensed by at least one acoustic sensor 14 and produce the at least one time-dependent acoustic data signal 36. At least one acoustic sensor 14 may transmit at least one time-dependent acoustic data signal 36 to computing device 16 using electrical signals, Bluetooth, Wi-Fi, radio, or any other suitable transmission pathway.

Thermal spray system 10 includes at least one optical sensor 15. In some examples, as shown in FIG. 1, thermal spray system 10 includes a plurality of optical sensors 15, such as at least two optical sensors 15. Each of the at least one optical sensor 15 is configured to optically sense thermal spray system 10. At least one optical sensor 15 may include, for example, an image sensor such as a complementary metal-oxide-semiconductor (CMOS) sensor, a charge-coupled device (CCD) sensor, thermal image sensor, focal plane array (FPA) sensor, a photodetector, or optoelectric elements that generate an electrical signal in response to incident photons. In some examples, at least one optical sensor 15 may generate a signal indicative of a one-dimensional image (for example, a linear array of pixels or other image elements), two-dimensional image (for example, a planar array of pixels or other image elements), or three-dimensional image (for example, a three-dimensional array of pixels or other image elements). In some examples, at least one optical sensor 15 may generate a signal indicative of at least one pixel or a single image element. In some examples, at least one optical sensor 15 may generate real-time, near-real-time or continuous signals, for example, a video feed or another continuous image signal. In some examples at least one optical sensor 15 may generate intermittent or periodic image signals, for example, snapshots at predetermined intervals of time.

The at least one optical sensor 15 may be configured to sense optical signals within a predetermined wavelength or wavelength range. In some examples, the at least one optical sensor 15 may be configured to sense optical signals that may or may not be visually perceptible. For example, one or more components of thermal spray system 10, or one or more flow streams of thermal spray system 10, may generate, refract, reflect, or transmit visible, ultraviolet, or infrared wavelengths, and at least one optical sensor 15 may detect at least one such wavelength or wavelength band or range.

Each optical sensor of the at least one optical sensor 15 is configured to generate a respective image data signal 38 and communicate at least one image data signal 38 to computing device 16. In some examples, at least one image data signal 38 includes a digital data signal, and at least one optical sensor 15 includes an analog-to-digital converter. In other examples, at least one image data signal 38 may include an analog signal. In some examples, at least one optical sensor 15 may include an amplifier to amplify the signal sensed by at least one optical sensor 15 and produce the at least one image data signal 38. At least one optical sensor 15 may transmit at least one image data signal 38 to computing device 16 using electrical signals, Bluetooth, Wi-Fi, radio, or any other suitable transmission pathway.

Computing device 16 may be configured to control operation of one or more components of thermal spray system 10 automatically or under control of a user. For example, computing device 16 may be configured to control operation of thermal spray gun 12, gas feed line 20 (and the source of gas to gas feed line 20), material feed line 24 (and the source of material to material feed line 24), at least one acoustic sensor 14, at least one optical sensor 15, and the like. Computing device 16 also may be configured to receive at least one time-dependent acoustic data signal 36 from at least one acoustic sensor 14, at least one image data signal 38 from at least one optical sensor 15, and analyze the at least one time-dependent acoustic data signal 36 and at least one image data signal 38 to determine a control signal 17 to be sent to at least one system component of thermal spray system 10 for adjusting one or more process control parameters (and ultimately, process outputs) of thermal spray system 10 based on the analysis.

During a thermal spray process, thermal spray system 10 performs at least one process, such as depositing a coating of spray material on spray target 18. Thermal spray system 10 and the thermal spray process performed by thermal spray system 10 are associated with a plurality of process control parameters, a plurality of measured process parameters, and a plurality of process outputs. The plurality of control parameters may include, for example, a primary gas flow rate, a secondary gas flow rate, a gun current, a carrier gas flow rate, a powder feed rate, a temperature, a pressure, a mass flow rate, a volumetric flow rate, a molecular flow rate, a molar flow rate, a composition, a velocity, or a concentration, or combinations thereof. The plurality of measured process parameter may include parameters sensed by one or more appropriate sensors. The measured parameters may be associated with a flowstream flowing through thermal spray system 10, for instance, gas flowing through gas feed line 20, or of exit flowstream 30, or material flowing through material feed line 24, or one or more components of thermal spray system 10. For example, the parameters may include as-measured voltages of one or more components (for example, gun voltage), gas flow rates, gun power, plume width, plume temperature, plume velocity, plume location, acoustic emissions or spectrum, a temperature, a pressure, a mass flow rate, a volumetric flow rate, a molecular flow rate, a molar flow rate, a composition, a velocity, or a concentration, or other process parameters, as measured by one or more sensors or meters. The sensors or meters may include, for example, voltage or current sensors, flow sensors or meters, thermometers, thermocouples, anemometers, pressure gauges, spectrometers, or the like. The plurality of process outputs may include, for example, a coating microstructure, a coating hardness, a coating adhesion, a coating deposition rate, a coating deposition efficiency, a coating quality, a coating color, a coating density, or combinations thereof. One or more of control parameters, measured process parameters, or process outputs may deviate from designed or nominal values or ranges.

Computing device 16 may be configured to compare the control parameter deviations, measured process parameters, or process output deviations to the nominal or designed specifications or parameter ranges, for example, in real-time, or in near real-time during operation of thermal spray system 10. In some examples, process deviations may include at least one of material feed fluctuation, for instance, powder pulsing, flow blockage (for e.g., of one or more of gas feed line 20, exit flowstream 30, material feed line 24), gas leakage, or a process deviation resulting from incompatibility (for e.g., wrong type or configuration of a component, for instance, using a nozzle that is unsuitable for a high viscosity flow) or wear of the at least one component. In some examples, wear of the at least one component may include wear of thermal spray gun 12, including wear of thermal spray outlet 32, wear of energy source 26, and wear of material inlet port 28, for instance, powder port wear.

As described above, system components of thermal spray system 10 and processes performed by thermal spray system 10 generate sounds (for example, acoustic signals 34) during the thermal spray process. For example, acoustic signals 34 may originate from thermal spray gun 12 (e.g., energy source 26, thermal spray outlet 32, material inlet port 28, or gas inlet port 22), gas feed line 20, exit flowstream 30, material feed line 24, impact of the coating material against spray target 18, or any other component associated with thermal spray system 10, such as a coating material hopper, a coating material feeder, a gun or part manipulating robot or machine, an air handling system, a dust filtering system, or the like.

Acoustic signals 34 generated by the components depend on control parameters, process attributes, or process outputs, and may change in response to changes thereof. For example, acoustic signals 34 produced by gas feed line 20 may change in response to any one or more of the temperature, pressure, flowrate, viscosity, composition, or concentration of the flowstream in gas feed line 20 changing. Similarly, acoustic signals 34 produced by material feed line 20 may change in response to any one or more of the temperature, pressure, flowrate, viscosity, composition, or concentration of the carrier gas of the spray material in material feed line 24 changing. Acoustic signals 34 produced by exit flowstream 30 may change in response to, for example, any one or more of the temperature, pressure, flowrate, viscosity, composition, or concentration of exit flowstream 30 changing. Acoustic signals 34 produced by spray target 18 may change in response to any one or more of the temperature, pressure, flowrate, viscosity, composition, or concentration of the spray material impacting the spray target changing, or the composition, bulk or surface geometry of spray target 18 changing, or even in response to the thickness of the coating of spray material on spray target 18 changing. Acoustic signals 34 generated by gas feed port 22, material feed port 28, spray outlet 32 may change as the respective system component wears. In some examples, acoustic signals 34 generated by a worn spray outlet 32, for instance, a worn nozzle, differs from acoustic signals 34 generated by a new (e.g., previously unused) nozzle. A worn nozzle may produce a lower temperature plasma or a more turbulent plasma, that may decrease the temperature and velocity of spray material, producing a coating with lower hardness, increased porosity, and poor deposition efficiency. A worn or incorrect type of powder port may change the injection velocity of spray material, which may change the thermal profile encountered by spray material along a path to spray target 18. This may lead to an increased portion of unmelted spray material or a greater proportion of spray material passing through or bouncing off the plasma, affecting the coating properties. Leaks in a powder feed line may decrease injection velocity, similarly affecting the coating properties. Leaks in the plasma gas feed line may decrease the plasma temperature and velocity. Accidental or inadvertent incorrect setting or entry of typical input parameters may also affect a process attribute.

In some examples, respective control parameters, process attributes, or process outputs may be associated with one or more respective frequency bands within acoustic signals 34. For example, a peak frequency in the tens of kilohertz (kHz; e.g., between about 13 kHz and about 15 kHz) may be associated with spray outlet 32, such as a spray nozzle, and may change as the spray outlet 32 mechanically wears. Other process attributes may similarly be associated with respective frequencies or frequency bands, which may change in frequency value, intensity, or the like, based on the value of the process attribute.

In some examples, acoustic signals 34 may be affected by the portion of the thermal spray process which is being performed. For example, acoustic signals 34 generated during an initial startup period by components of thermal spray system 10 may differ from acoustic signals 34 generated when thermal spray system 10 is performing a spraying process, or acoustic signals 34 generated when thermal spray system 10 is being shut down. Hence, computing device 16 may analyze at least one time-dependent acoustic data signal 36 to determine at which portion of the thermal spray process thermal spray system 10 is, or a user may identify the portion of the thermal spray process at which thermal spray system 10 is, and computing device 16 may utilize this information when analyzing at least one time-dependent acoustic data signal 36. In some examples, computing device 16 may identify the process stage at which thermal spray system 10 is operating by comparing a respective time-dependent acoustic data signal of at least one time-dependent acoustic data signal 36 of thermal spray system 10 in the unknown process stage to a time-dependent acoustic data signal from a known configuration or process stage of a thermal spray system.

Other factors may result in acoustic signals 34 changing. For example, acoustic signals 34 generated by components of thermal spray system 10 in a first configuration may differ from acoustic signals 34 generated in a second configuration. For example, the first configuration and the second configuration may differ in the spatial relationship between system components, or in the predetermined operating range of a process attribute. In some examples, computing device 16 may analyze a respective time-dependent acoustic data signal of at least one time-dependent acoustic data signal 36 to identify the configuration of components of thermal spray system 10.

In some examples, at least one acoustic sensor 14 may be configured to enhance detection of one or more acoustic signal of acoustic signals 34 compared to another one or more acoustic signal of acoustic signals 34. For instance, a first acoustic sensor of at least one acoustic sensor 14 may be positioned adjacent to a selected system component of thermal spray system 10, oriented toward a selected component of thermal spray system 10, or the like to enhance detection of a selected acoustic signal of acoustic signals 34 compared to another one or more acoustic signal of acoustic signals 34. For example, a first acoustic sensor of at least one acoustic sensor 14 may be positioned adjacent to thermal spray gun 12 to sense acoustic signals 34 originating from thermal spray gun 12 (e.g., material inlet port 28, gas inlet port 22, spray outlet 32), and a second acoustic sensor of at least one acoustic sensor 14 may be positioned adjacent to material feed line 24 to sense acoustic signals 34 originating from material feed line 24. The at least one acoustic sensor 14 may be located near a component or at a zone within the thermal spray system 10, or may be oriented towards a component to sense sound from the component, or otherwise more accurately attribute the sound to a source. In an example, at least one acoustic sensor 14 may include multiple acoustic sensors forming an acoustic sensor network that captures sound generated by various components of thermal spray system 10.

Instead of, or in addition to, sound or acoustic analysis, optical, photo- or image analysis may be performed to monitor and control thermal spray system 10. For example, optical sensors 15 may capture one or more images of thermal spray system 10 in predetermined wavelength bands, for example, in the visible infrared, or ultraviolet spectrum, or other image types, for example, polarized or thermal images. Optical sensors 15 may capture image data corresponding to at least one of single images, periodic images, images triggered by predetermined events or conditions, or rapid or continuous video or image data. The images may include one or more components of thermal system 10, thermal system 10 as a whole, or an interior or exterior of thermal system 10, or regions in the vicinity of thermal system 10, or one or more flowstreams flowing through thermal system 10, substrate 18, coating, or the like.

The image data captured by optical sensors 15 may depend on control parameters, process attributes, or process outputs, and may change in response to changes thereof. For example, the image data may exhibit changes in response to one or more of the temperature, pressure, flowrate, viscosity, composition, or concentration of the flowstream in gas feed line 20 changing, or in response to any one or more of the temperature, pressure, flowrate, viscosity, composition, or concentration of the carrier gas of the spray material in material feed line 24 changing. Image data associated with exit flowstream 30 may change in response to, for example, any one or more of the temperature, pressure, flowrate, viscosity, composition, or concentration of exit flowstream 30 changing. Image data associated with spray target 18 may change in response to any one or more of the temperature, pressure, flowrate, viscosity, composition, or concentration of the spray material impacting the spray target changing, or the composition, bulk or surface geometry of spray target 18 changing, or even in response to the thickness of the coating of spray material on spray target 18 changing. Image data associated with gas feed port 22, material feed port 28, spray outlet 32 may change as the respective system component wears. In some examples, image data associated with a worn spray outlet 32, for instance, a worn nozzle, differs from that associated with a new (e.g., previously unused) nozzle. A worn nozzle may produce a lower temperature plasma or a more turbulent plasma, that may decrease the temperature and velocity of spray material, producing a coating with lower hardness, increased porosity, and poor deposition efficiency. A worn or incorrect type of powder port may change the injection velocity of spray material, which may change the thermal profile encountered by spray material along a path to spray target 18. The change in thermal profile may be captured by visible or infrared imaging. This may lead to an increased portion of unmelted spray material or a greater proportion of spray material passing through or bouncing off the plasma, affecting the coating properties. Leaks in a powder feed line may decrease injection velocity, similarly affecting the coating properties. Leaks in the plasma gas feed line may decrease the plasma temperature and velocity. One or more of these may be captured by image data, for example, in visible, infrared, x-ray, or ultraviolet spectrum, or may influence the polarization of light ultimately imaged by optical sensors 15. Accidental or inadvertent incorrect setting or entry of typical input parameters may also affect thermal spray processes in a way that is optically or otherwise captured by optical sensors 15.

In some examples, at least one optical sensor 15 may include two or more optical sensors 15 located at predetermined locations in, on, or about thermal spray system 10, for example, within spray chamber 11, or even exterior to spray chamber 11. For instance, a first optical sensor of at least one acoustic sensor 15 may be positioned adjacent to a selected system component of thermal spray system 10, oriented toward a selected component of thermal spray system 10, or the like to enhance imaging of a selected portion or region of thermal spray system 10. For example, a first optical sensor of at least one optical sensor 15 may be positioned adjacent to thermal spray gun 12 to image thermal spray gun 12 or a flow stream originating from thermal spray gun 12 or fluidically coupled to thermal spray gun 12 (e.g., material inlet port 28, gas inlet port 22, spray outlet 32), and a second optical sensor of at least one optical sensor 15 may be positioned adjacent to material feed line 24 to image material feed line 24. In an example, at least one optical sensor 15 may include multiple optical sensors forming an optical sensor array that captures two-dimensional or three-dimensional images or point clouds of thermal spray system 10 or components thereof.

In some examples, thermal spray system 10 may include at least one optical element to direct light paths to optical sensors 15. For example, the at least optical element may include mirrors, reflectors, refractors, diffraction gratings, optical filters, diffusers, prisms, light guides, light sources, light absorbers, or any other suitable optical elements. In some examples, the at least one optical element may selectively cause optical sensors 15 to capture image data associated with predetermined wavelengths or wavelength bands.

As described above, computing device 16 may control thermal spray system 10 by analyzing at least one time-dependent acoustic data signal 36 and image data signal to determine information about thermal spray system 10, which may include, for example, a component configuration, component wear, process control parameters, measured process parameters, process outputs, or process deviations of thermal spray system 10. For example, computing device 16 may be configured to receive the at least one time-dependent acoustic data signal 36, transform the at least one time-dependent acoustic data signal 36 to a frequency-domain spectrum, receive at least one image data signal 38, and transform the at least one image data signal into at least one image. Computing device 16 may further configured to determine, based on at least the plurality of control parameters, the frequency domain spectrum, the at least one image, and the plurality of process outputs, a relationship between the plurality of control parameters and the plurality of process outputs using machine learning. Computing device 16 may further use the determined relationship to monitor or control thermal spray system 10. For example, computing device 16 may be configured to determine, based on the relationship determined by machine learning, respective values of the plurality of control parameters configured to cause the thermal spray system to generate predetermined values of the plurality of process outputs, and control, based on the respective values of the plurality of control parameters, the thermal spray system to adjust the plurality of process outputs toward a plurality of respective operating ranges by sending a control signal to thermal spray system.

In some examples, because of the different positions of at least one acoustic sensor 14 or of at least one optical sensor 15, computing device 16 may analyze at least one of the at least time-dependent acoustic data signal 36 or the image data signal 38 to determine information related to particular components of thermal spray system 10. For example, computing device 16 may utilize the intensity of respective frequency components of at least one time-dependent acoustic data signal 36 to determine a distance from the acoustic sensor from which the at least one time-dependent acoustic data signal 36 was received to the component generating the acoustic signal, and may attribute the acoustic signal to that component. Additionally or alternatively, computing device 16 may utilize data indicative of the position and/or orientation of the acoustic sensor from which the at least one time-dependent acoustic data signal 36 was received relative to a selected component to the acoustic signal to a component. Computing device 16 may utilize the intensity or spatial distribution of respective components (for example, wavelength bands, or predetermined color points of a predetermined color space, such as RGB, CMYK, L,a,b, or another color system), of image data signal 36 to determine a distance from the optical sensor from which the at least one image data signal 38 was received to the component that was imaged generating the acoustic signal, and may attribute the image to that component or flowstream. Additionally or alternatively, computing device 16 may utilize data indicative of the position and/or orientation of the optical sensor from which the at least one image data signal 38 was received relative to a selected component to attribute the image to a component or flowstream.

In this way, computing device 16 may analyze the at least one time-dependent acoustic data signal 36, multiple time-dependent acoustic data signals, image data signal 38, or multiple image data signals to determine relationships between plurality of control parameters and the plurality of process outputs, and use the relationships to monitor and control thermal spray system 10.

In some examples, computing device 16 may analyze at least one of at least one acoustic data signal 36 or image data signal 38 to identify process control parameters that may result in unsatisfactory coating characteristics or process outputs of thermal spray system 10. In some examples, computing device 16 may analyze at least one time-dependent acoustic data signal 36 or image data signal 38 to determine whether control parameters, measured process parameters, or process outputs associated with the process performed by thermal spray system 10 are within a nominal or expected range, or if the control parameters, measured process parameters, or process outputs are varying compared to or deviating from the nominal or expected range.

If any of the control parameters, measured process parameters, or process outputs vary or deviate from the nominal or expected range, computing device 16 may control thermal spray system 10 to adjust the process attribute. In some examples, to control thermal spray system 10, computing device 16 may select at least one component of thermal spray system 10 based on the parameter or output to be adjusted. For example, computing device 16 may select, based on the respective values of the plurality of control parameters, at least one component of thermal spray system 10, where the at least one component is controlled by one or more of the plurality of control parameters. Computing device 16 may control, based on the respective values of one or more of the plurality of control parameters, thermal spray system 10 to adjust the plurality of process outputs toward the plurality of respective operating ranges by sending the control signal to the at least one component. In some examples, the at least one component may include at least one of thermal spray gun 12, energy source 26 (for example, a plasma electrode), material inlet port 28 (for example, a powder port), or the like.

Computing device 16 may determine control signal 17 to be sent to the at least one component, such that control signal 17 would cause the at least one component to operate in an adjusted condition that would cause one or more control parameter, measured parameter, or process output to be adjusted, e.g., toward the nominal or expected range or value. Computing device 16 may store in a storage device theoretically derived or experimentally derived relationships between control signal 17 and the process attribute. For example, the relationship between control signal 17 and the process attribute may be represented in the form of equations, sets of equations, numerical approximations, look-up tables, or other suitable data structures. Thus, computing device 16 may determine control signal 17 based on a known relationship between, for example, a magnitude of control signal 17 and a magnitude of the process attribute.

In some examples, computing device 16 may determine the known relationship by machine learning. After determining control signal 17, computing device 16 may send control signal 17 to the at least one component to result in real-time or near real-time control of thermal spray system 10. For example, the at least one component may operate in an adjusted condition after receiving control signal 17 to cause the variation or deviation of the control parameter, measured parameter, or process output from the nominal or expected range to reduce, or substantially reduce to zero.

In some examples, by utilizing at least one time-dependent acoustic data signal 36 or image data signal 38, and by using machine learning, computing device 16 may perform real-time or near-real-time control of the operation of thermal spray system 10. By monitoring an actual output of the process, a better indication of deviation of the process attribute can be detected. Process control systems that rely on various electrical/mechanical subsystems such as flow meters, flow controllers, amp meters, and voltmeters can be inaccurate or out of calibration, and are generally upstream of the actual spraying process. For example, monitoring powder flow to thermal spray guns by monitoring pressure, carrier gas flow rate and mechanical feeder component rates of motion don't provide indication of downstream phenomenon such as powder pulsing, flow blockage, component wear, or gas leakage. These changes affect the powder trajectory upon injection and can significantly change the thermal profile powder experiences and thus change the resultant particle temperature, velocity, and coating properties. Thus, monitoring and analyzing a signal representative of one or more outputs of thermal spray system 10 may provide a more accurate indication of process attributes of thermal spray system 10, e.g., compared to monitoring inputs to thermal spray system 10 using a flow meter, flow controller, amp meter, or voltmeter. Further, in some examples, flow meters, flow controllers, amp meters, and voltmeters may require calibration, and falling out of calibration may reduce the accuracy of the feedback provided by out-of-calibration flow meters, flow controllers, amp meters, and voltmeters.

Because of the potentially large number of control parameters, measured process parameters, and process outputs, determining relationships between them by conventional techniques, for example, statistical analysis, may pose difficulties. Some techniques may require prediction or guesses as to the nature of mathematical relationships between two or more parameters (for example, linear, exponential, logarithmic, periodic, non-linear, etc.), which may not be possible or feasible because of the complexity or number of parameters and outputs. Computing device 16 may use machine learning may be used to more efficiently or accurately determine such relationships, even without a priori knowledge or information. The function of thermal spray 10 and computing device 16 are further described with reference to FIGS. 2 and 3.

Figure 2:
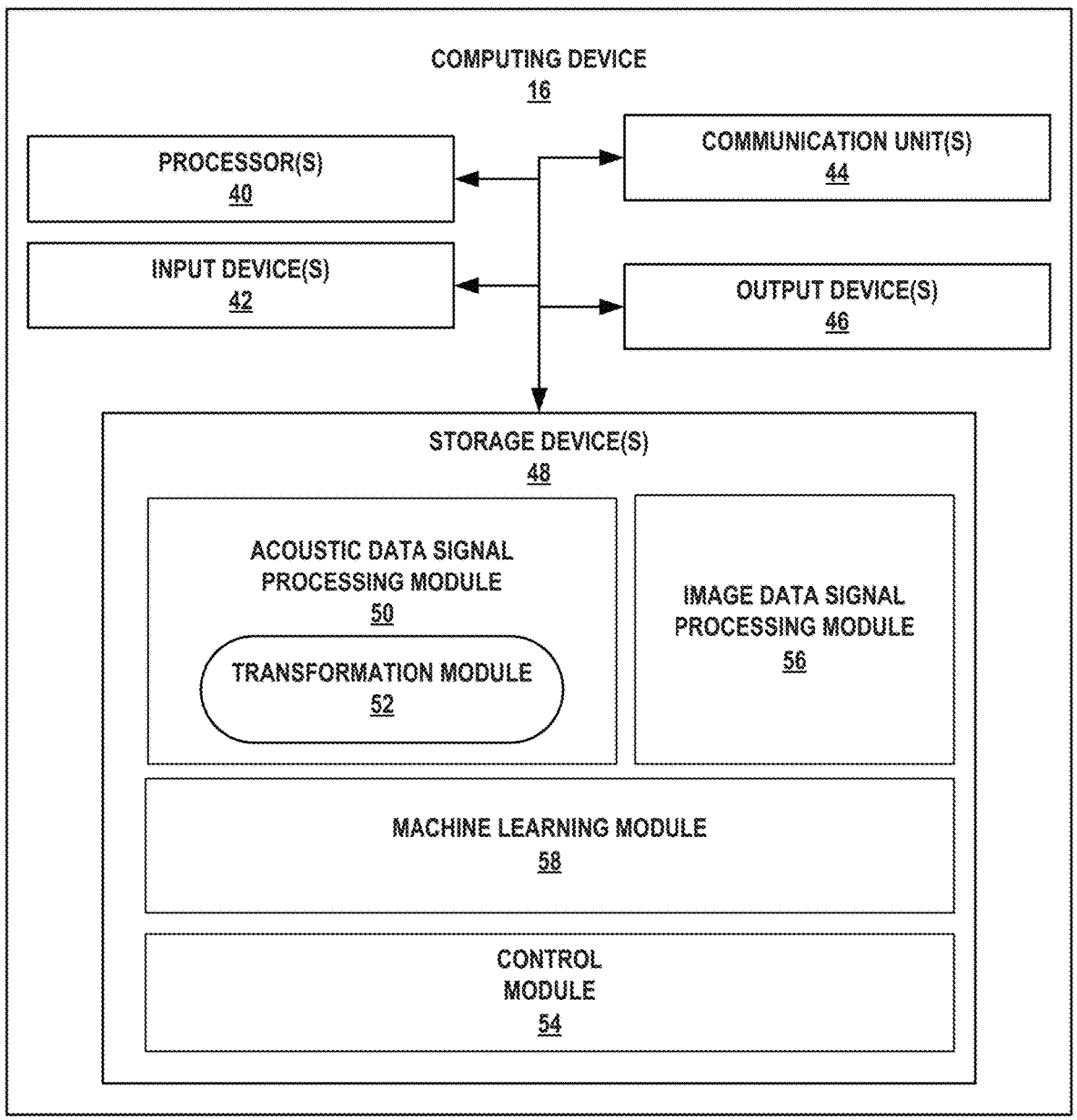
FIG. 2 is a conceptual block diagram illustrating an example of a computing device for controlling a process performed by a thermal spray system by adjusting a process attribute in response to an acoustic signal and an optical signal generated by the thermal spray system.

FIG. 2 is a conceptual block diagram illustrating an example of computing device 16 illustrated in FIG. 1. In some examples, computing device 16 may include, for example, a desktop computer, a laptop computer, a workstation, a server, a mainframe, a cloud computing system, or the like. In some examples, computing device 16 controls the operation of system 10, including, for example, thermal spray gun 12, energy source 26, gas feed line 20, exit flowstream 30, acoustic sensors 14, optical sensors 15, material feed line 24, and spray target 18.

In the example illustrated in FIG. 2, computing device 16 includes one or more processors 40, one or more input devices 42, one or more communication units 44, one or more output devices 46, and one or more storage devices 48. In some examples, one or more storage devices 48 stores acoustic data signal processing module 50, transformation module 52, control module 54, image data signal processing module 56, and machine learning module 58. In other examples, computing device 16 may include additional components or fewer components than those illustrated in FIG. 2.

One or more processors 40 are configured to implement functionality and/or process instructions for execution within computing device 16. For example, processors 40 may be capable of processing instructions stored by storage device 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 16 during operation. Storage devices 48, in some examples, include a computer-readable storage medium or computer-readable storage device. In some examples, storage devices 48 include a temporary memory, meaning that a primary purpose of storage device 48 is not long-term storage. Storage devices 48, in some examples, include a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in some examples, are used by software or applications running on computing device 16 to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 16 further includes one or more communication units 44. Computing device 16 may utilize communication units 44 to communicate with external devices (e.g., thermal spray gun 12, entry flowstream 130, exit flowstream 30, acoustic sensor 14, optical sensor 15, spray material, and spray target 18) via one or more networks, such as one or more wired or wireless networks. Communication unit 44 may include a network interface card, such as an Ethernet card, an optical transceiver, a radio frequency transceiver, or any other type of device that can send and receive information. Other examples of such network interfaces may include WiFi radios or Universal Serial Bus (USB). In some examples, computing device 16 utilizes communication units 44 to wirelessly communicate with an external device such as a server.

Computing device 16 also includes one or more input devices 42. Input devices 42, in some examples, are configured to receive input from a user through tactile, audio, or video sources. Examples of input devices 42 include a mouse, a keyboard, a voice responsive system, video camera, microphone, touchscreen, or any other type of device for detecting a command from a user.

Computing device 16 may further include one or more output devices 46. Output devices 46, in some examples, are configured to provide output to a user using audio or video media. For example, output devices 46 may include a display, a sound card, a video graphics adapter card, or any other type of device for converting a signal into an appropriate form understandable to humans or machines. In some example, computing device 16 outputs a representation of one or more of the at least one time-dependent acoustic data signal 36, of the frequency-domain spectrum, at least one image data signal, at least one process control parameter, at least one measured parameter, or at least one process output, via output devices 46. In some examples, computing device 16 outputs a representation of control signal 17 via output devices 46.

In some examples, computing device 16 may determine control signal 17 or generate an alert in response to one or more of the control parameters, measured process parameters, or process outputs, via output devices 46. For example, computing device 16 may generate auditory signals, such as a beep, an alert tone, or an alerting sound, or visual signals, such as an icon on a display, flashing lights, or a combination of visual and audible signals, to indicate a process parameter or output variance or deviation. In some examples, an operator may thus be alerted, and may choose to investigate thermal spray system 10. As another example, computing device 16 may generate an alert that is transmitted over a network to another computing device, including a hand-held computing device, for instance, a cellphone. The alert signal may include information about the process control parameter, measured parameter, or process output, or a variance thereof. In some examples, computing device 16 may determine control signal 17 and send control signal 17 to at least one component to control thermal spray system 10 by adjusting the process control parameter, for example, to ultimately reduce a variance or deviation of a process parameter or output attribute from a normal or expected range.

Computing device 16 also may include one or more of an acoustic data signal processing module 50, a control module 54, image data signal processing module 56, and machine learning module 58. In some examples, acoustic data signal processing module 50 pre-processes or processes at least one time-dependent acoustic data signal 36 to prepare at least one time-dependent acoustic data signal 36 for analysis by control module 54 or machine learning module 58. In some examples, acoustic data signal processing module 50 may include a transformation module 52 for transforming at least one time-dependent acoustic data signal 36 from a time-domain spectrum to a frequency-domain spectrum. In some examples, image data signal processing module 56 pre-processes or processes at least one image data signal 38 to prepare at least one image data signal 36 for analysis by control module 54 or machine learning module 58.

Machine learning module 58 is configured to determine, based on at least the plurality of control parameters, the frequency domain spectrum, the at least one image, and the plurality of process outputs, one or more relationships between the plurality of control parameters and the plurality of process outputs using machine learning. Machine learning module 58 may also be configured to determine other relationships, for example, between the plurality of control parameters and the plurality of measured process parameters, or between the plurality of measured process parameters and the plurality of process outputs. Machine learning module 58 may include one or more sub-modules for, or otherwise be configured to implement, one or more of linear discriminant analysis (LDA), quadratic discriminant analysis (QDA), K-nearest neighbors, support vector machines (SVM), regression analysis, sensitivity analysis, optimization algorithms (e.g., basinhopping, Broyden-Fletcher-Goldfarb-Shanno (BFGS)), fuzzy logic, artificial neural network (ANN), gaussian processes (GP), or other machine learning algorithms, to determine one or more relationships between the plurality of control parameters, the plurality of measured process parameters, and the plurality of process outputs.

Control module 54 is configured to determine, based on the relationship determined by machine learning module 58, respective values of the plurality of control parameters configured to cause the thermal spray system to generate predetermined values of the plurality of process outputs. Control module 54 may also be configured to control, based on the respective values of the plurality of control parameters, the thermal spray system to adjust the plurality of process outputs toward a plurality of respective operating ranges by sending a control signal to thermal spray system 10. In some examples, machine learning module 58 may be configured to determine the control signal, for example, based on one or more of the relationships between the plurality of control parameters, the plurality of measured process parameters, and the plurality of process outputs. In some examples, functions described with reference to machine learning module 58 may be performed by control module 54, and computing device 16 may include a separate machine learning module 58. Functions performed by acoustic data signal processing module 50, transformation module 52, control module 54, image data signal processing module 56, and machine learning module 58 are explained below with reference to the example flow diagram illustrated in FIG. 3.

Acoustic data signal processing module 50, transformation module 52, control module 54, image data signal processing module 56, and machine learning module 58 may be implemented in various ways. For example, acoustic data signal processing module 50, transformation module 52, control module 54, image data signal processing module 56, and/or machine learning module 58 may be implemented as software, such as an executable application or an operating system, or firmware executed by one or more processors 40. In other examples, acoustic data signal processing module 50, transformation module 52, control module 54, image data signal processing module 56, and/or machine learning module 58 may be implemented as part of a hardware unit of computing device 16. In some examples, acoustic data signal processing module 50 includes transformation module 52, as shown in FIG. 2. In some examples, transformation module 52 is separate from acoustic data signal processing module 50.

Computing device 16 may include additional components that, for clarity, are not shown in FIG. 2. For example, computing device 16 may include a power supply to provide power to the components of computing device 16. Similarly, the components of computing device 16 shown in FIG. 2 may not be necessary in every example of computing device 16.

Examples of thermal spray system 10 and computing device 16 are described with reference to FIGS. 1 and 2 above, including examples of at least one acoustic sensor 14 for generating at least one time-dependent acoustic data signal 36 indicative of acoustic signals 34 generated by thermal spray system 10, and at least one optical sensor 15 for generating at least one image data signal 38 indicative of thermal spray system 10. Example techniques for monitoring and analyzing at least one time-dependent data signals 36 and image data signals 38 to determine process control parameters, measured process parameters, process outputs, and to ultimately control thermal spray system 10 are described with reference to FIG. 3.

Figure 3:
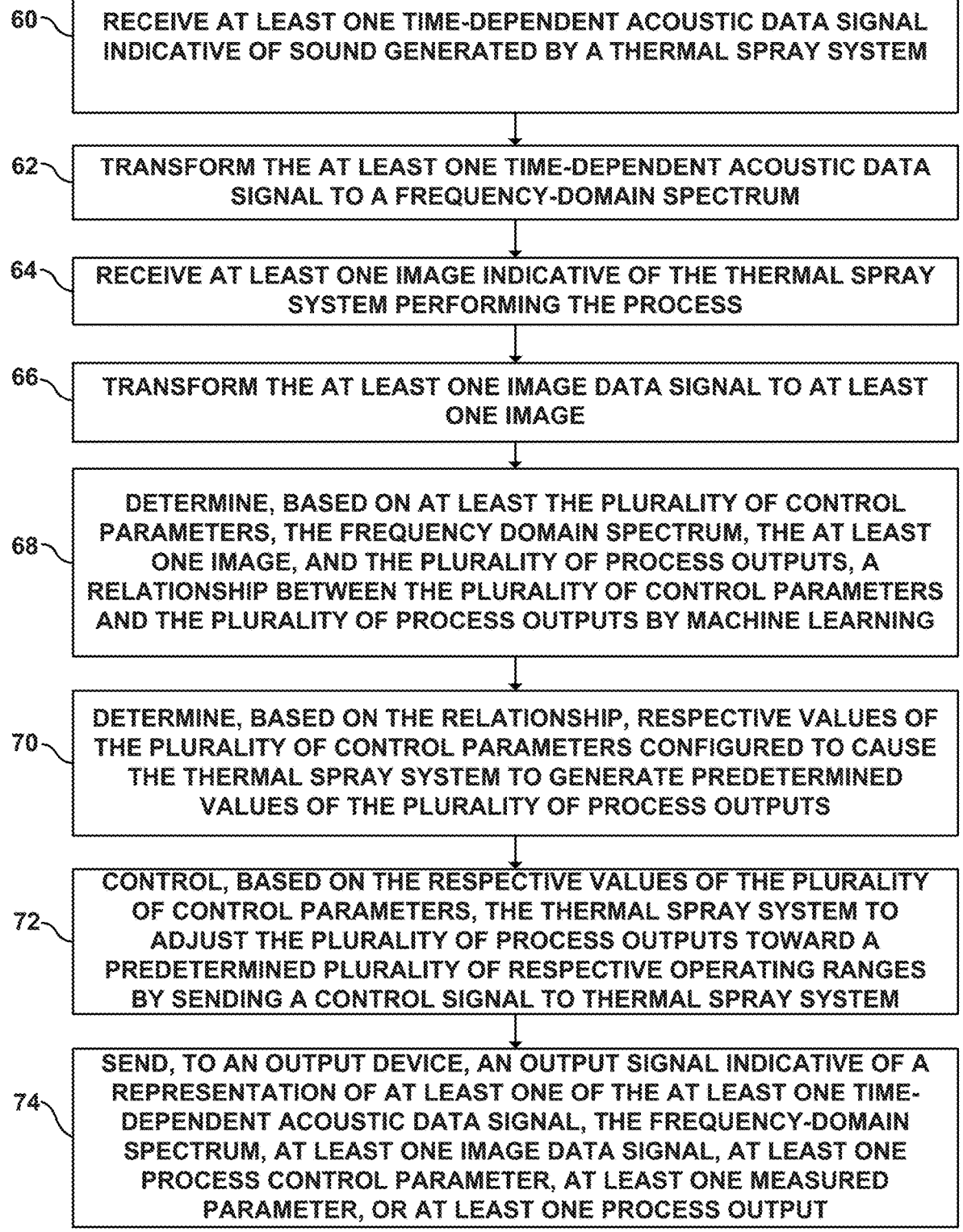
FIG. 3 is a flow diagram illustrating an example technique for controlling a process performed by a thermal spray system by adjusting a process attribute in response to an acoustic signal and an optical signal generated by the thermal spray system.

FIG. 3 is a flow diagram illustrating an example technique for analyzing an acoustic signal generated by a thermal spray system performing a process associated with a plurality of process attributes to determine a process attribute of the plurality of process attributes. In some examples, a computing device, such as computing device 16, may implement the technique of FIG. 3 to analyze the at least one time-dependent acoustic data signal 36 indicative of sound generated by thermal spray system 10 performing a process and at least one image data signal 38 indicative of thermal spray system 10, described in various examples with reference to FIG. 1 above. Computing device 16 may determine relationships between one or more of process control parameters, measured process parameters, process outputs, and ultimately control thermal spray system 10. The technique of FIG. 3 will be described with reference to thermal spray system 10 of FIG. 1, and computing device 16 of FIGS. 1 and 2, for purposes of description only. It will be appreciated that the technique of FIG. 3 may be used to analyze at least one acoustic data signal to determine a process attribute of processes performed by other thermal spray systems, that other computing devices may implement the technique of FIG. 3, or both.

The technique of FIG. 3 includes receiving, by computing device 16, from at least one acoustic sensor 14, at least one time-dependent acoustic data signal 36 indicative of acoustic signals 34 generated by thermal spray system 10 (60). In some examples, at least one time-dependent acoustic data signal 36 may include analog signals, and acoustic data signal processing module 50 of computing device 16 may process at least one acoustic data signal 36 by performing an analog-to-digital conversion. In other examples, the received at least one time-dependent acoustic data signal 36 may include digital signals and acoustic data signal processing module 50 may not perform analog-to-digital conversion of at least one time-dependent acoustic data signal 36. In some examples, acoustic data signal processing module 50 of computing device 16 may filter at least one acoustic data signal 36 through signal processing filters such as band pass filters, high pass filters, low pass filters, comb filters, notch filters, or other filters, for instance, deconvolution filters, or noise filters to filter out undesirable signal components, such as noise, superfluous signal components, such as harmonics, or to reduce or compress the information in at least one acoustic data signal 36.

The technique of FIG. 3 also includes transforming, by transformation module 52 of computing device 16, at least one time-dependent acoustic data signal 36 to a frequency-domain spectrum (62). The frequency-domain spectrum may include intensity or amplitude as a function of frequency. In some examples, transformation module 52 of computing device 16 transforms at least one time-dependent acoustic data signal 36 to a frequency-domain spectrum using at least one of a fast Fourier transform or a discrete Fourier transform. In some examples, transformation module 52 may perform the transformation before, during or after other processing such as filtering described above.

The technique of FIG. 3 includes receiving, by computing device 16, from at least one optical sensor 15, at least one image data signal 38 indicative of thermal spray system 10 (64). In some examples, at least one image data signal 38 may include analog signals, and image data signal processing module 56 of computing device 16 may process at least one image data signal 36 by performing an analog-to-digital conversion. In other examples, the received at least one image data signal 38 may include digital signals and image data signal processing module 56 may not perform analog-to-digital conversion of at least one image data signal 38. In some examples, image data signal processing module 56 of computing device 16 may filter at least one image data signal 38 through image processing filters such as band pass filters, high pass filters, low pass filters, comb filters, notch filters, or other filters, for instance, deconvolution filters, or noise filters to filter out undesirable signal components, such as noise, Bayer filter, demosaicing filter, sharpening filters, or reduce or compress the information in at least one image data signal 38.

The technique of FIG. 3 also includes transforming, by image data signal processing module 56 of computing device 16, at least one image data signal 38 to an image (66). Image data signal processing module 56 may also perform further optional image processing, for example, one or more of conversion between different image file formats, cropping, rotation, skewing, deskewing, sharpening, masking, edge detection, color inversion, color remapping, black and white conversion, and the like. In some examples, image data signal processing module 56 may perform the transformation before, during or after other processing such as filtering described above.

The technique of FIG. 3 further includes determining, by machine learning module 58 of computing device 18, a relationship between the plurality of control parameters and the plurality of process outputs by machine learning (68). The machine learning may include at least one of linear discriminant analysis (LDA), quadratic discriminant analysis (QDA), K-nearest neighbors (KNM), support vector machines (SVM), regression analysis, sensitivity analysis, optimization algorithms (e.g., basinhopping, Broyden-Fletcher-Goldfarb-Shanno (BFGS)), fuzzy logic, artificial neural network (ANN), or gaussian processes (GP).

In some examples, machine learning module 58 may include regression models such as linear regression or polynomial regression to identify acoustic or image features that may be indicative of deviation of process outputs from process limits. In some examples, machine learning module 58 may include classification models such as LDA, QDA, KNM, or SVM. In some examples, machine learning module 58 includes sensitivity analysis modules, for example, one-at-a-time analysis, or regression analysis, to identify control parameters to be modified to maintain or return process outputs within predetermined specifications. In some examples, machine learning module 58 includes optimization modules, for example, BFGS, or basinhopping, to identify control parameters to be modified to maintain or return process outputs within predetermined specifications. In some examples, machine learning module 58, or control module 54, may include a fuzzy logic controller to control thermal spray system 10, for example, by determining, generating, and sending control signal 17.

In some examples, machine learning module determines the relationship (68) based on at least the plurality of control parameters, the frequency domain spectrum, the at least one image, and the plurality of process outputs. In some examples, the determining (68) may include one or more sub-steps. For example, the determining (68) may include determining by machine learning module 58, based on at least the plurality of control parameters, the frequency domain spectrum, the at least one image, and the plurality of process outputs, at least one of a relationship between the plurality of control parameters and a plurality of measured process parameters or a relationship between the plurality of measured process parameters and the plurality of process outputs. For example, machine learning module 58 may determine a first relationship between the plurality of control parameters and a plurality of measured process parameters and a second relationship between the plurality of measured process parameters and the plurality of process outputs.

In some examples, the determining (68) includes, by machine learning module 58, determining the relationship between the plurality of control parameters and the plurality of process outputs by at least one of comparing real-time or near-real time respective values of the plurality of process outputs with immediately prior respective values of the plurality of process outputs, comparing real-time or near-real time respective values of the plurality of process outputs with respective values at 5%, 25%, 50%, or 75% of a present run time, or comparing real-time or near-real time respective values of the plurality of process outputs with predetermined threshold values of the plurality of process outputs.

The technique of FIG. 3 further includes determining, by control module 54 of computing device 16, based on the relationship, respective values of the plurality of control parameters configured to cause the thermal spray system to generate predetermined values of the plurality of process outputs (70). As described above, in some examples, the plurality of control parameters ultimately influences the plurality of process outputs of thermal spray system 10. Computing device 16 may further control thermal system 10 using the plurality of control signals.

The example technique of FIG. 3 may include selecting, by control module 54, based on the respective values of the plurality of control parameters, at least one component of thermal spray system 10. For example, the at least one component may be controlled by the plurality of control parameters and may influence one or more process outputs. For example, control module 54 may select one or more components that affect one or more process outputs, to control the one or more components to control the process output. For example, the process output may be influenced by a flow rate of a carrier gas, and the selected at least one component may include a flow valve. Thus, if the flow rate deviates from a nominal flow rate, control module 54 may select the flow valve to be controlled to control the flow rate of the carrier gas. For example, if the flow rate is higher than the nominal flow rate, control module 54 may select the flow valve to be controlled to restrict the flow to reduce the flow rate to the nominal flow rate, to ultimately maintain or return one or more process outputs within predetermined tolerances.

In some examples, the example technique may include controlling, by control module 54 of computing device 16, based on the respective values of the plurality of control parameters, thermal spray system 10 to adjust the plurality of process outputs toward the plurality of respective operating ranges by sending control signal 17 to the at least one component. Control module 54 of computing device 16 may control thermal spray system 10, for example, by controlling the selected at least one component of thermal spray system 10. In some examples, control module 54 may determine control signal 17 to be sent to the selected at least one component based on one or more relationships between control parameters, measured process parameters, and process outputs. In some examples, machine learning module 58 may determine control signal 17 by machine learning based on one or more relationships between control parameters, measured process parameters, and process outputs the at least one characteristic of the frequency-domain spectrum of time-dependent acoustic data signal 36 (68).

In some examples, one or more relationships may indicate that a process output is to be increased, and control module 54 may determine a control signal that may cause the selected at least one component to cause the process output to increase. Alternatively, the one or more relationships may indicate that the process output is to be decreased, and control module 54 may determine a control signal that may cause the selected at least one component to decrease the process output. In some examples, the one or more relationships may indicate that the operation of the selected at least one component or thermal spray system 10 should be paused or shut down. For example, the at least one characteristic may indicate a severely worn nozzle in need of replacement. Thus, in some examples, control module 54 may determine a control signal that may cause the selected at least one component, or even thermal spray system 10 as a whole, to at least temporarily shut down, allowing for the selected at least one component or another component to be replaced. For example, control module 54 may determine a control signal 17 that causes component applying an electric current to an electrode to stop, so that a worn nozzle may safely be replaced with a replacement nozzle.

Computing device 16 may collect and process acoustic data signal 36 through the use of a FFT (Fast Fourier Transform) to extract frequency information (for example, a spectrum indicative of peak frequencies and intensities). At least one characteristic of the spectrum may be used to as a "fingerprint," for example, to query a database or other library directly or implement a communication protocol, if necessary, to continually process acoustic data signal 36 and statistically fit it to the nearest possible match from a database or a look-up table.

After determining a control signal for the selected at least one component, or respective control signals for respective more than one components of the selected at least component, control module 54 may control thermal spray system 10. For example, the technique of FIG. 3 may include controlling, by control module 54 of computing device 16, based on the respective values of the plurality of control parameters, thermal spray system 10 to adjust the plurality of process outputs toward a plurality of respective operating ranges by sending a control signal 17 to thermal spray system 10 (72). For example, control module 54 may send an operating signal via a wired connection, a communications bus, or a wireless connection to the at least one component. In response to receiving the control signal from control module 54, the at least one component may change its operation to result in an adjustment of the process attribute.

In these ways, computing device 16 may ultimately control thermal spray system 10 so that the process outputs are within predetermined tolerances, ranges, or specifications. In some examples, computing device 16 may cause thermal spray system 10 to shut-down, for example, in response to determining that one or more components of thermal spray system 10 is worn beyond predetermined limits, or in response to determining that coating may need to be re-initiated.

While control module 54 may separately perform determining the values of the plurality of control parameters (70), selecting the at least one component, determining control signal 17, and sending control signal 17 to thermal spray system 10 or to the at least one component (72), as described with reference to the example technique of FIG. 3, in other examples, control module 54 may combine one or more of these steps into one or more steps. For example, control module 54 may determine a control signal as part of determining the relationships (68).

In some examples, the example technique of FIG. 3 may optionally include sending, to an output device, an output signal indicative of a representation of at least one of the at least one time-dependent acoustic data signal 36, the frequency-domain spectrum, at least one image data signal 38, at least one process control parameter, at least one measured parameter, or at least one process output (74). For example, one or both of control module 54 or machine learning module 58 may intermittently, periodically, continuously, or at near-continuous intervals of time, determine relationships between control parameters, measured process parameters, and process outputs, provide the result of the determination as feedback to an operator by outputting a display of numeric differences, charts, graphs, alarms, warnings, or the like, or to a process controller for automatic adjustments to operating parameters of thermal spray system 10 or immediate shut down of thermal spray system 10.

In this way, computing device 16 may perform the examples techniques described above with reference to FIG. 3 to analyze at least one time-dependent acoustic data signal 36 and at least one image data signal 38 to monitor and control thermal spray system 10 performing a process, and determine whether one or more process control parameters, measured process parameters, or process outputs are within a nominal or expected range, or if they are varying compared to an expected value. Based on the analysis, computing device 16 may control thermal spray system 10, for example, by selecting one or more components of thermal spray system 10, and sending one or more respective control signals to control the respective components to adjust the process control parameters, measured process parameters, or process outputs. In some examples, an operator may control thermal spray system 10 based on a component control strategy determined by computing device 16. For example, computing device 16 may determine one or more components of thermal spray system 10 as being responsible for a deviation, and identify the components by generating an output detectable by an operator. In response, the operator may control the components to restore the process attribute to the nominal operating range. In some examples, operator intervention may not be required, and computing device 16 may perform the analysis and control in real-time or near real-time, for example, within minutes, seconds, or fractions of seconds after determining the process attribute, to adjust the process control parameters, measured process parameters, or process outputs by controlling thermal spray system 10 in real-time or near real-time.

While example systems and techniques have been described with reference to FIGS. 1 to 3, additional example techniques are described with reference to FIGS. 4 to 6. One or more of the techniques or flow diagrams described with reference to FIGS. 4 to 6 may be partially or completely integrated or implemented by computing device 16, or into the example technique of FIG. 3.

Figure 4:
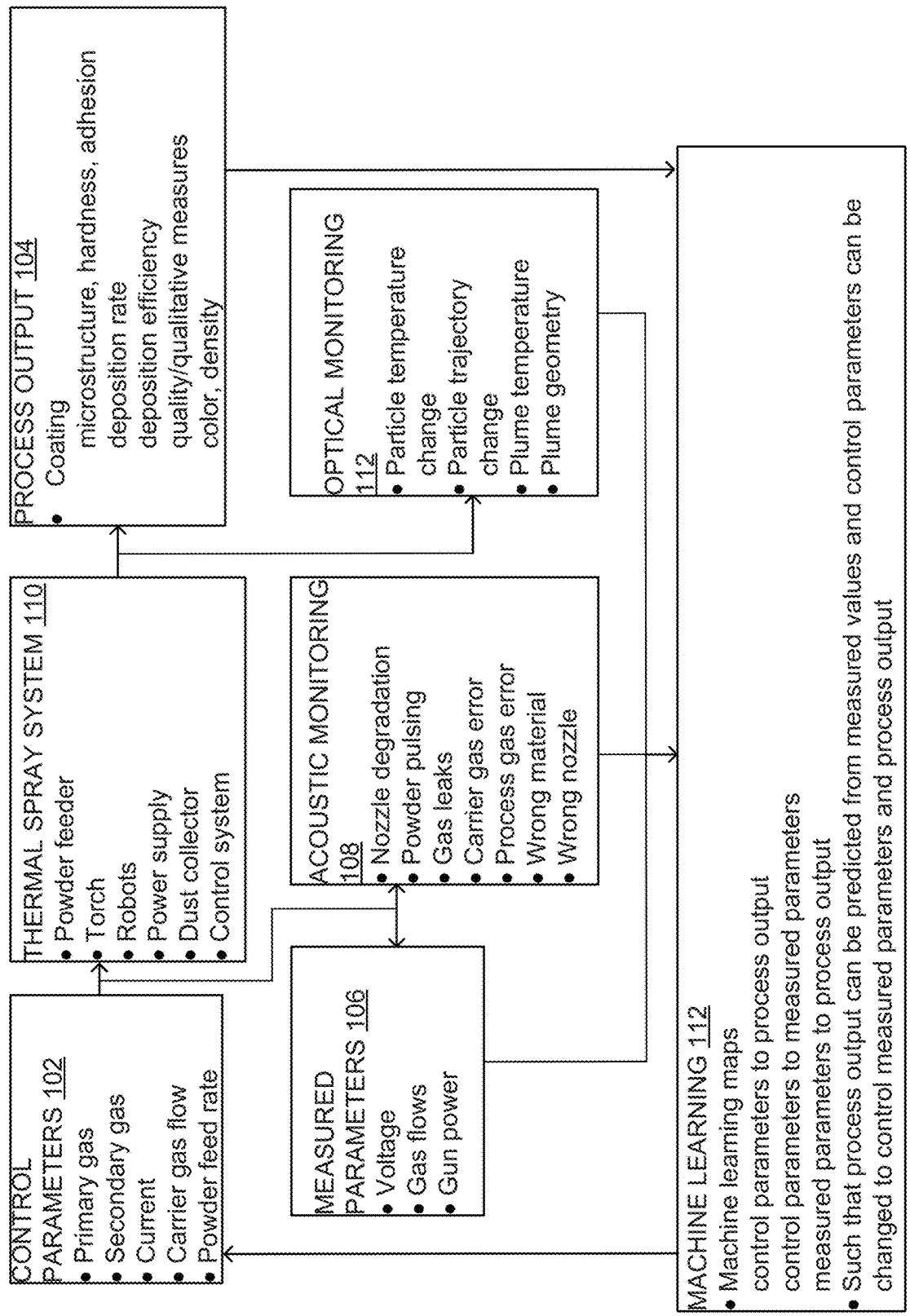
FIG. 4 is a diagram illustrating the relationships between control parameters and process outputs of a thermal spray system and their mapping by machine learning based on acoustic and optical monitoring.

FIG. 4 is a diagram illustrating the relationships between control parameters 102 and process outputs 104 of a thermal spray system 110 (or thermal spray system 16) and their mapping by a machine learning module 112 based on acoustic monitoring 108 and optical monitoring 112. In some examples, machine learning module 112 may also map relationships between measured process parameters 106 control parameters 102 or process outputs 104. Control parameters 102 may be considered to be "inputs" to thermal spray system 110, and may include one or more of primary and secondary gas flows, current, carrier gas flow and powder feed rate, or other parameters. Process outputs 104 may be considered to be "outputs" of thermal spray system 110, and may account for the qualitative or quantitative of coating quality generated by thermal spray system 110. Coating quality may include, for example, abradability, erosion resistance, expected lifetime, oxidation resistance, hot corrosion resistance, and other metrics of quality. Measured process parameters 106 may correspond to parameters of thermal spray system 110 or flowstreams or components of thermal spray system 110 that are measured by appropriate sensors or measurement devices. Machine learning module 112 may use machine learning to determine relationships between one or more of control parameters 102, process outputs 104, or measured process parameters 106, and may control thermal spray system 110 to maintain process outputs within predetermined specifications.

Figure 5:
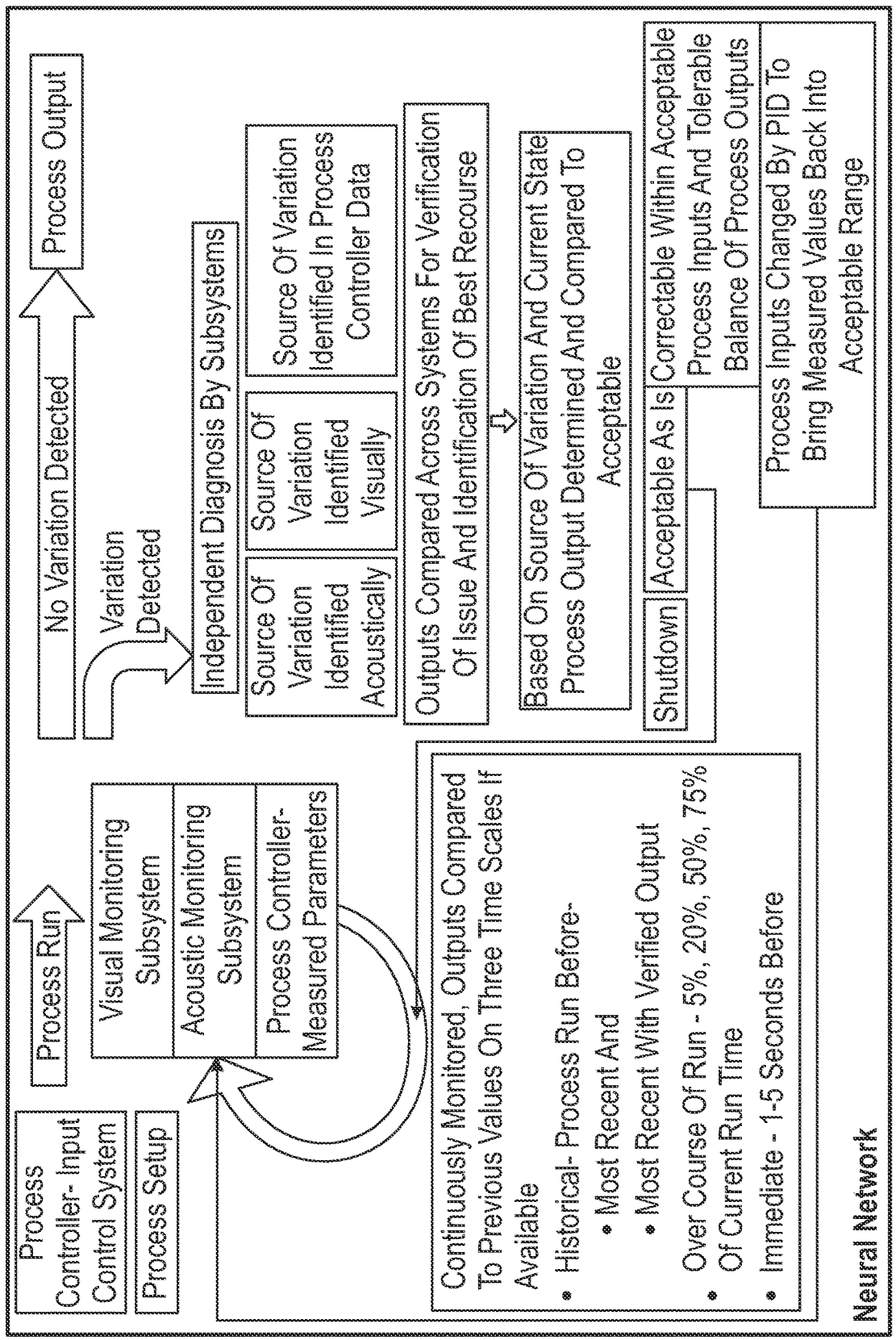
FIG. 5 is a process control flow diagram for controlling a process performed by a thermal spray system by adjusting a process attribute using a neural network in response to an acoustic signal and an optical signal generated by the thermal spray system.

FIG. 5 is a process control flow diagram for controlling a process performed by a thermal spray system by adjusting a process attribute using a neural network in response to an acoustic signal and an optical signal generated by the thermal spray system. The neural network maps process inputs (control parameters) to process outputs, process inputs to sensor outputs (measured process parameters), and sensor outputs (measured process parameters) to process outputs. These maps or relationships may be used to predict process outputs (for example, coating characteristics) based on one or more process inputs (control parameters) or sensor readouts (measured outputs) and alter process inputs (control parameters) to maintain process outputs. This may be accomplished in real time, near-real time, or intermittent or periodic times. The neural network may compare present data with past data on immediate, recent and long term time scales to detect a variety of changes to the system. Based on the degree of change detected the neural net may permit the process to continue, alter the process to maintain coating characteristics, or halt the process for intervention.

Figure 6:
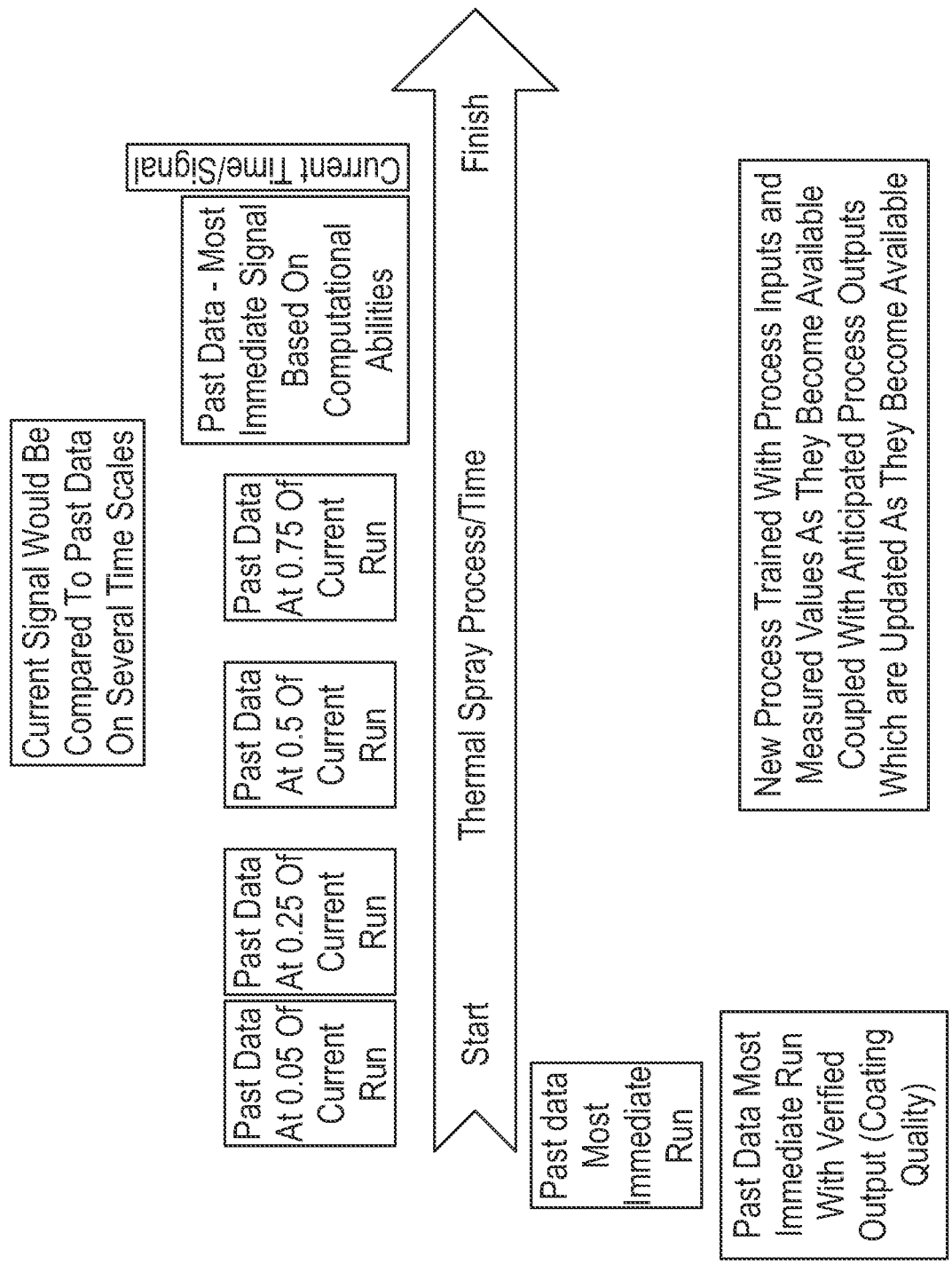
FIG. 6 is a conceptual diagram illustrating processing of thermal spray process data at different time scales by machine learning.

FIG. 6 is a conceptual diagram illustrating processing of thermal spray process data at different time scales by machine learning. These different time scales may account for varied time scales at which the thermal spray process can change. For example, electrodes may wear out over the course of days to weeks of operation, powder ports may wear over the course of a year, a gas leak can happen in an instant, flow meter calibration may drift over years, powder pulsing may occur over seconds. Thus, machine learning may be used to account for changes in relationships between control parameters, measured process parameters and process outputs over different time scales.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Example 1

The effect of thermal spray parameters on a thermal spray plume was evaluated.

Figure 7A:
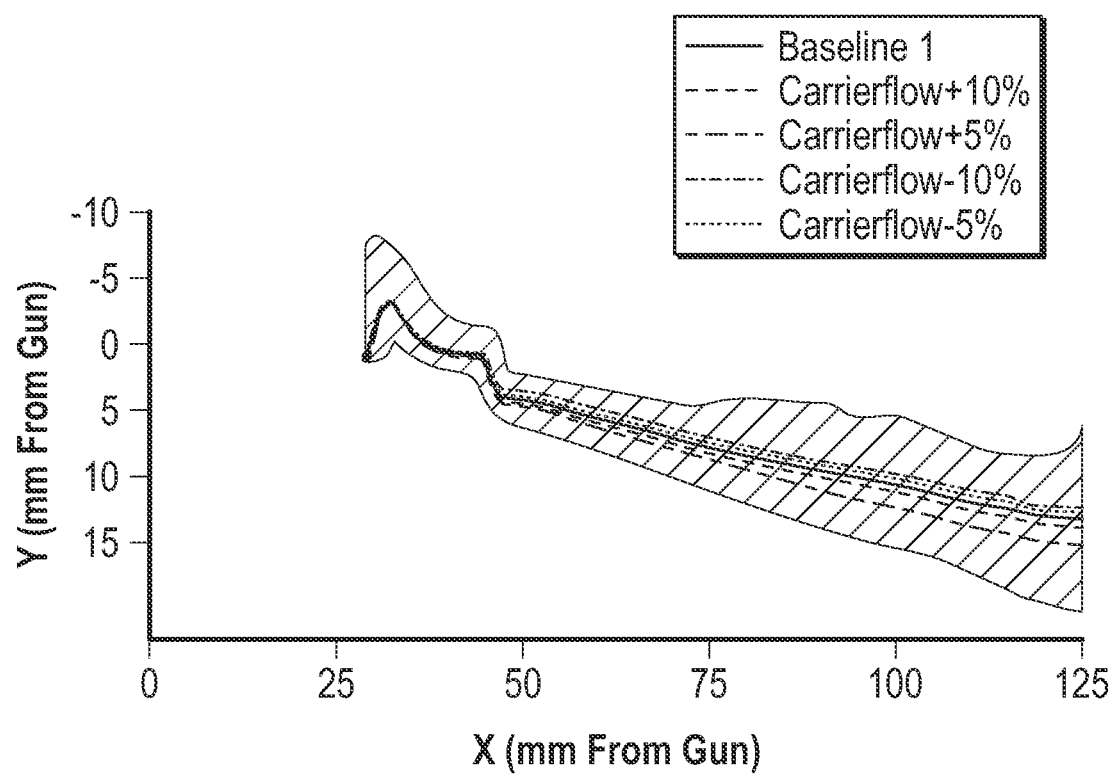
FIG. 7A is a chart illustrating the effect of carrier gas flow rate on the position of a thermal spray plume.
Figure 7B:
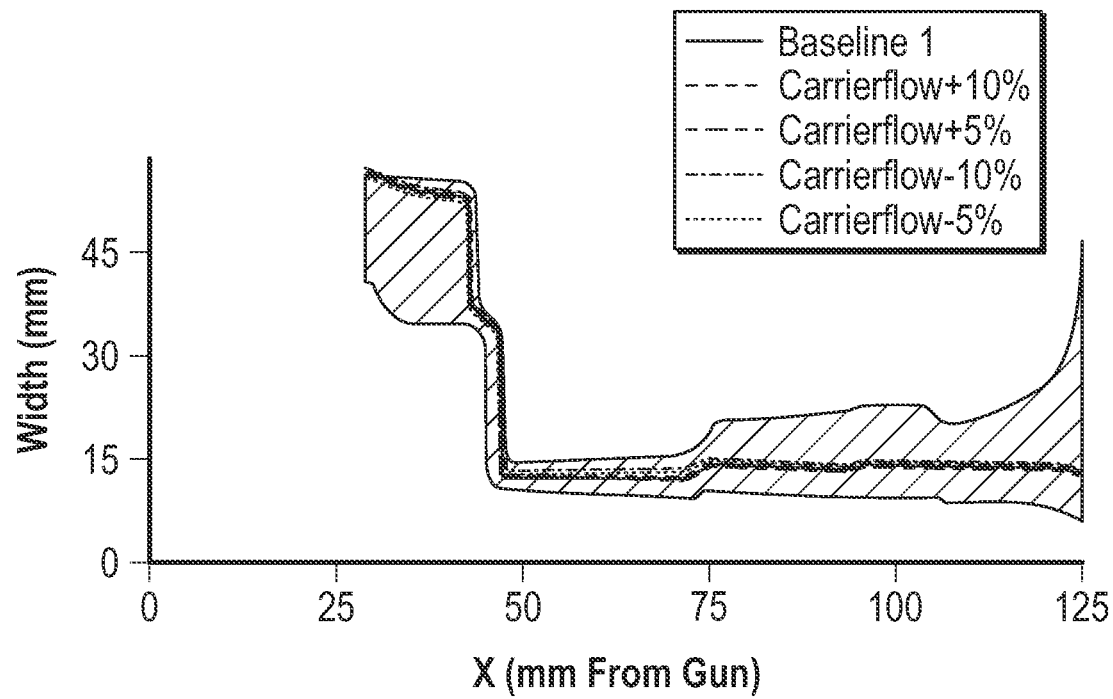
FIG. 7B is a chart illustrating the effect of carrier gas flow rate on the width of a thermal spray plume.
Figure 8A:
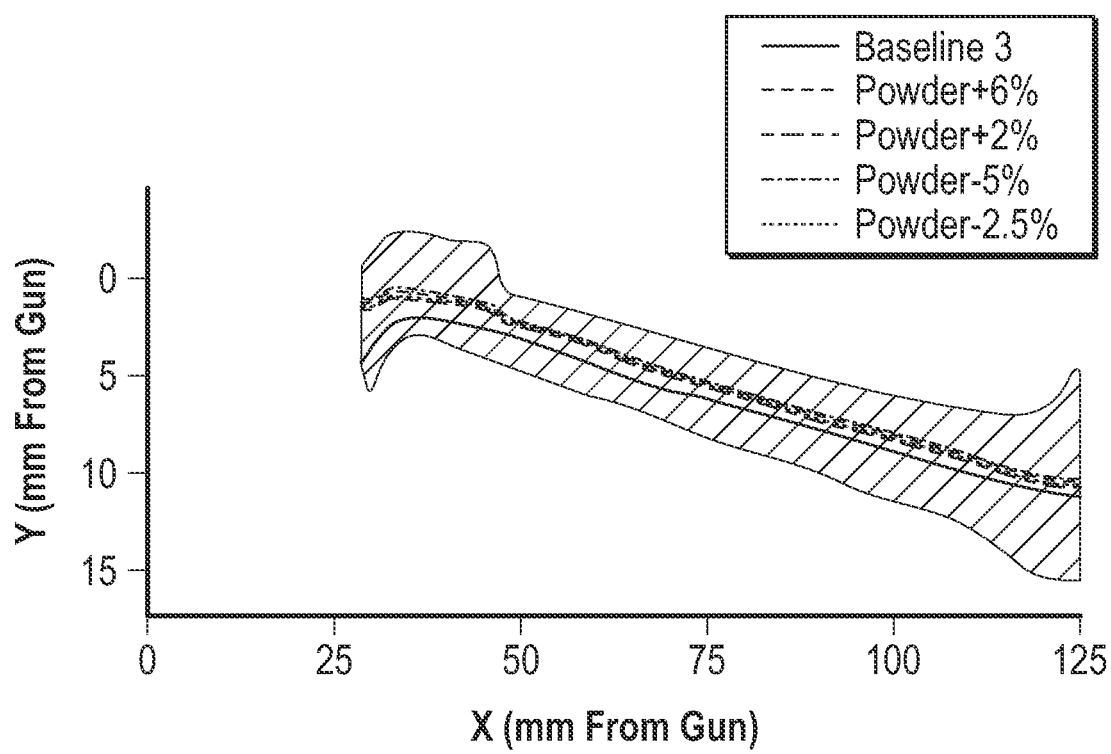
FIG. 8A is a chart illustrating the effect of powder feed rate on the position of a thermal spray plume.
Figure 8B:
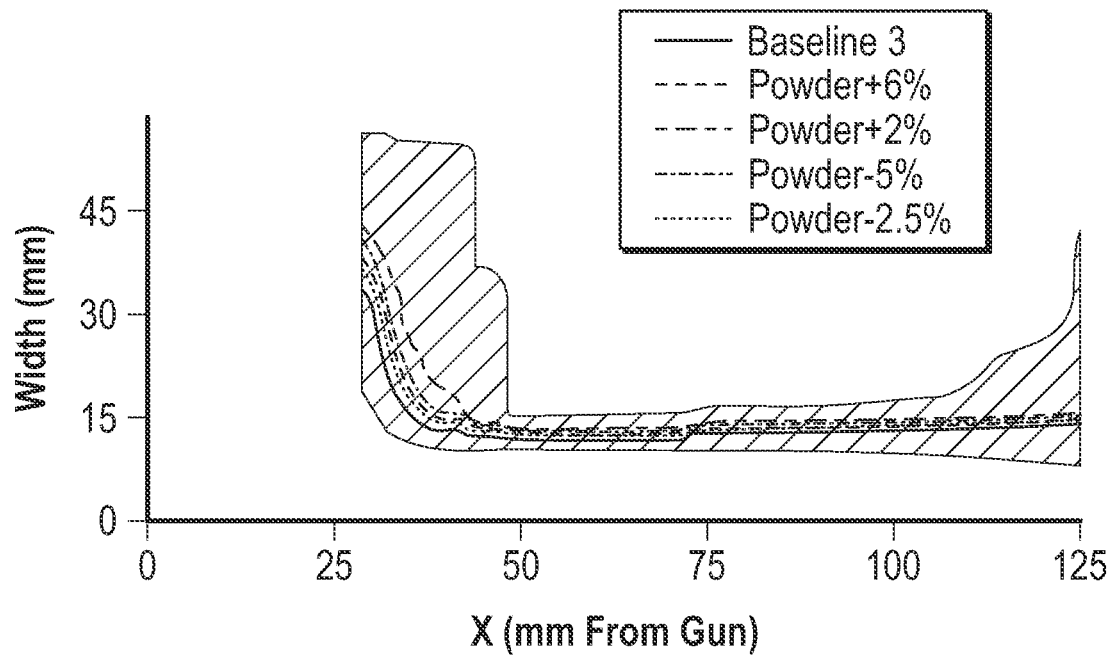
FIG. 8B is a chart illustrating the effect of powder feed rate on the width of a thermal spray plume.
Figure 9A:
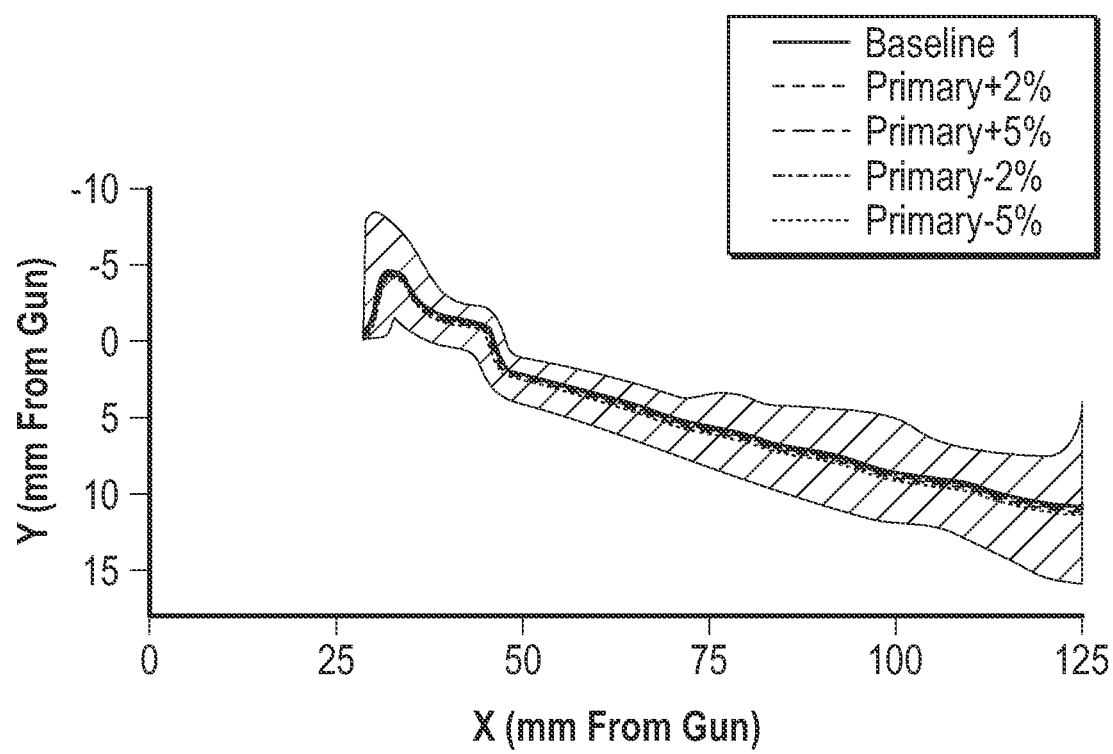
FIG. 9A is a chart illustrating the effect of primary gas flow rate on the position of a thermal spray plume.
Figure 9B:
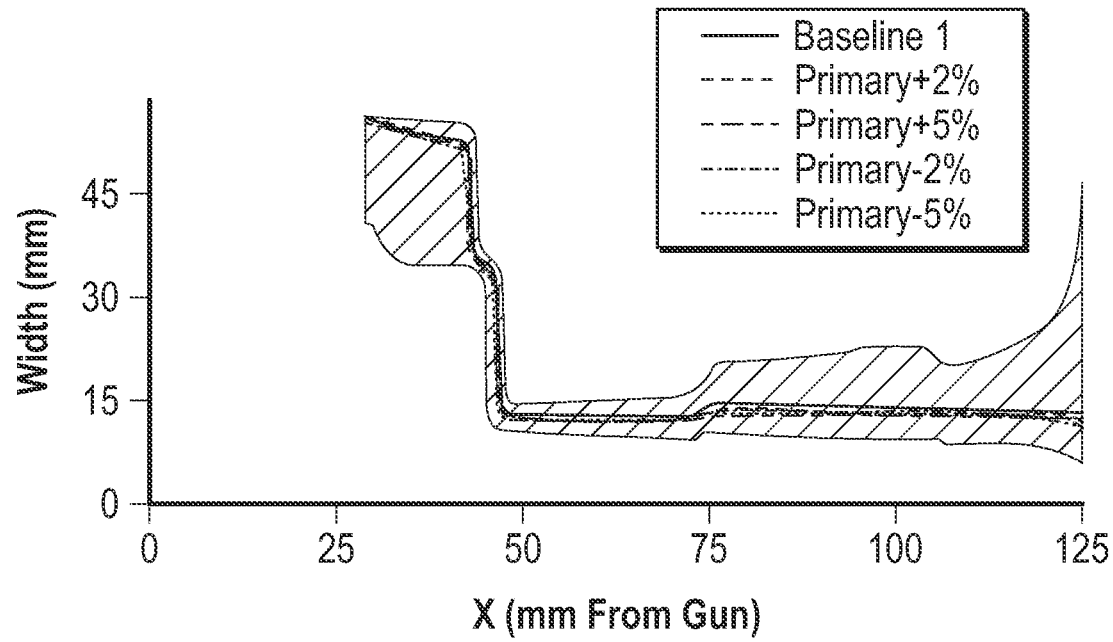
FIG. 9B is a chart illustrating the effect of primary gas flow rate on the width of a thermal spray plume.

Changes in position and width of a thermal spray plume in response to carrier gas flow rate, powder feed rate, and primary gas flow rate were monitored by an optical sensor. Video was generated by optically sensing the thermal spray plume, and images were obtained from the video. The images were analyzed to determine average plume position and width. FIG. 7A is a chart illustrating the effect of carrier gas flow rate on the position of a thermal spray plume. FIG. 7B is a chart illustrating the effect of carrier gas flow rate on the width of a thermal spray plume. FIG. 8A is a chart illustrating the effect of powder feed rate on the position of a thermal spray plume. FIG. 8B is a chart illustrating the effect of powder feed rate on the width of a thermal spray plume. FIG. 9A is a chart illustrating the effect of primary gas flow rate on the position of a thermal spray plume. FIG. 9B is a chart illustrating the effect of primary gas flow rate on the width of a thermal spray plume. Thus, optical monitoring was used to determine changes in thermal spray plume in response to changes in thermal spray parameters.

Example 2

Figure 10:
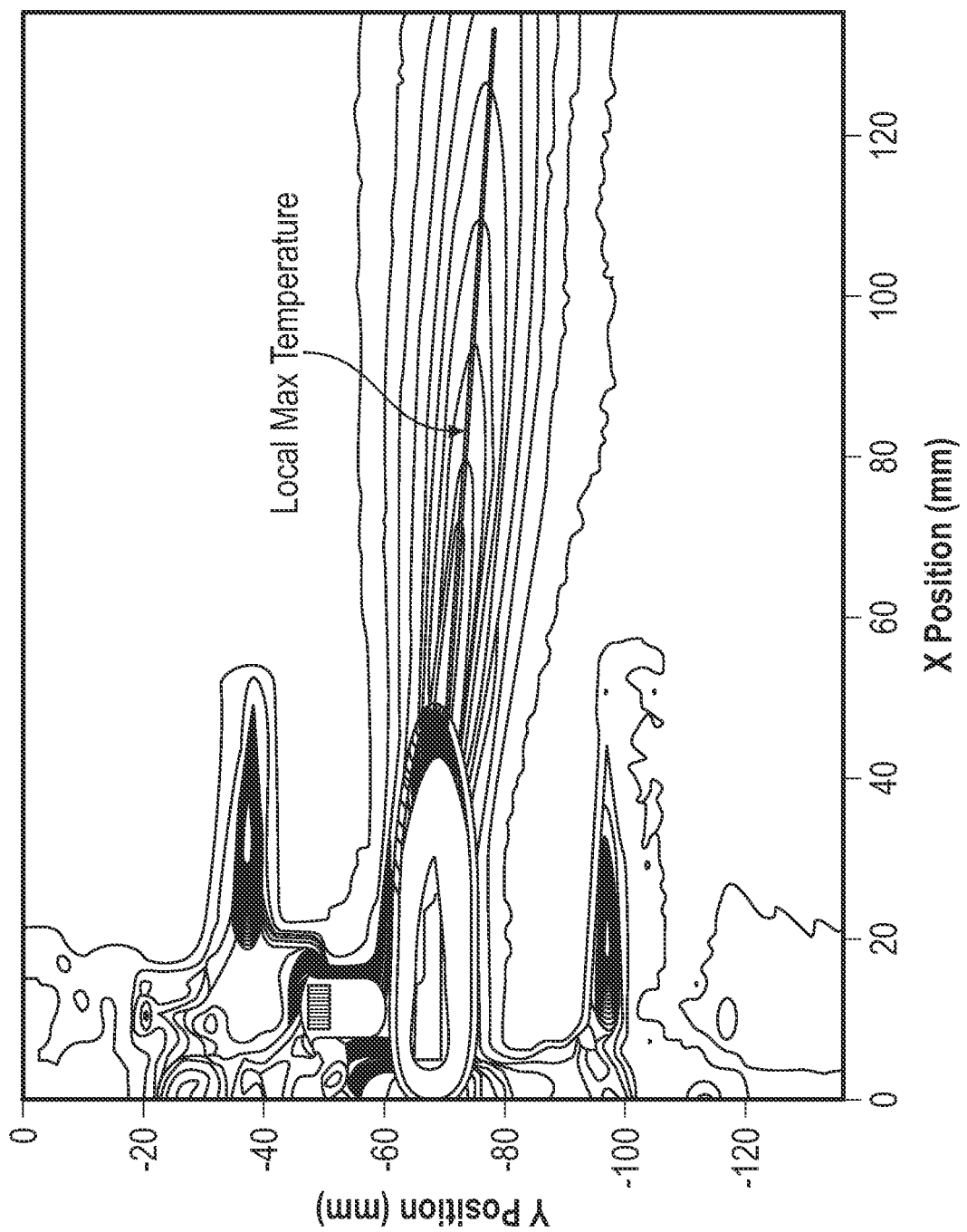
FIG. 10 is a chart illustrating a thermal profile of a thermal spray plume generated by an infrared imaging system.

An infrared imaging system was used to generate a thermal profile of a thermal spray plume. Infrared images were analyzed to generate a statistical average, and pixels were scaled to length (millimeters, mm). FIG. 10 is a chart illustrating a thermal profile of a thermal spray plume generated by the infrared imaging system. The local maximum temperature was measured along length of the plume beginning just beyond the plasma jet at about 40 mm from the jet.

Example 3

Audio segment classification was used to distinguish different thermal spray conditions was evaluated. Acoustic signals were obtained from acoustic sensors sensing sound generated by a plasma spray system including an F4-type gun. Linear discriminant analysis (LDA), K-nearest neighbors, and support vector machines (SVM) were trained using acoustic signal segments, with 45% of the data excluded from training and used for validation. The results are presented in TABLE 1.

TABLE 1

| Condition of F4 Gun Plasma | Used to Train | | Excluded from Training | |
|---|---|---|---|---|
| | Seconds of Process Audio | % Accuracy | Seconds of Process Audio | % Accuracy |
| High Argon | 495 | 100% | 400 | 100% |
| High Carrier Gas Flow Rate | 482 | 98% | 355 | 98% |
| Powder Line Leak | 486 | 100% | 405 | 100% |
| Low Argon | 603 | 97% | 529 | 96% |
| Low Carrier Gas Flow Rate | 462 | 100% | 429 | 100% |
| Low Feed Rate | 1180 | 86% | 1049 | 82% |
| Normal Conditions | 747 | 100% | 634 | 100% |
| Powder Line Leak- 0.3 NLPM (6%) | 244 | 91% | 190 | 84% |
| Powder Pulsing - Carrier Gas Induced | 276 | 99% | 223 | 97% |
| Powder Pulsing - Carrier Gas Induced (High Primary Gas) | 4 | 100% | 5 | 100% |
| Powder Pulsing - Carrier Gas Induced (Low Primary Gas) | 100 | 100% | 83 | 100% |
| Pulsing-Carrier | 794 | 96% | 640 | 97% |
| Used Nozzle | 677 | 100% | 530 | 100% |
| Worn Port 20% Area | 645 | 100% | 526 | 99% |

Various examples have been described. These and other examples are within the scope of the following claims.

The invention claimed is:

1. A system comprising:
   at least one acoustic sensor configured to generate at least one time-dependent acoustic data signal indicative of sound generated by a thermal spray system controlled by a plurality of control parameters and performing a process associated with a plurality of process outputs;
   at least one optical sensor configured to generate at least one image data signal indicative of the thermal spray system performing the process, wherein the at least one image data signal is real-time, near-real-time, or continuous; and
   a computing device comprising:
      a transformation module configured to transform the at least one time-dependent acoustic data signal to a frequency-domain spectrum;

a machine learning module configured to determine, based on at least the plurality of control parameters, the frequency-domain spectrum, the at least one image data signal, and the plurality of process outputs, a relationship between the plurality of control parameters and the plurality of process outputs by machine learning; and a control module configured to:
 determine, based on the relationship determined by the machine learning module, respective values of the plurality of control parameters configured to cause the thermal spray system to generate predetermined values of the plurality of process outputs, and
 control, based on the respective values of the plurality of control parameters, the thermal spray system to adjust the plurality of process outputs toward a plurality of respective operating ranges by sending a control signal to thermal spray system.

2. The system of claim 1, wherein the control module is configured to:
 select, based on the respective values of the plurality of control parameters, at least one component of the thermal spray system, wherein the at least one component is controlled by the plurality of control parameters, and
 control, based on the respective values of the plurality of control parameters, the thermal spray system to adjust the plurality of process outputs toward the plurality of respective operating ranges by sending the control signal to the at least one component.

3. The system of claim 2, wherein the system component comprises at least one of a thermal spray gun, a plasma electrode, a powder port, a gas inlet port, or a material inlet port.

4. The system of claim 1, wherein the plurality of control parameters comprises at least one of a primary gas flow rate, a secondary gas flow rate, a gun current, a gun position, a part position, a carrier gas flow rate, a powder feed rate, a temperature, a pressure, a mass flow rate, a volumetric flow rate, a molecular flow rate, a molar flow rate, a composition, a velocity, or a concentration, or combinations thereof.

5. The system of claim 1, wherein the plurality of process outputs comprises a coating microstructure, a coating hardness, a coating adhesion, a coating deposition rate, a coating deposition efficiency, a coating quality, a coating color, or a coating density, or combinations thereof.

6. The system of claim 1, wherein the machine learning module is configured to determine, based on at least the plurality of control parameters, the frequency-domain spectrum, the at least one image, and the plurality of process outputs, at least one of a relationship between the plurality of control parameters and a plurality of measured process parameters or a relationship between the plurality of measured process parameters and the plurality of process outputs.

7. The system of claim 1, wherein the machine learning module is configured to determine the relationship between the plurality of control parameters and the plurality of process outputs by at least one of comparing real-time or near-real time respective values of the plurality of process outputs with immediately prior respective values of the plurality of process outputs, comparing real-time or near-real time respective values of the plurality of process outputs with respective values at 5%, 25%, 50%, or 75% of a present run time, or comparing real-time or near-real time respective values of the plurality of process outputs with predetermined threshold values of the plurality of process outputs.

8. The system of claim 1, wherein the computing device further comprises an output device configured to output a representation of at least one of the at least one time-dependent acoustic data signal, the frequency-domain spectrum, at least one image data signal, at least one process control parameter, at least one measured parameter, or at least one process output.

9. The system of claim 1, wherein the process comprises at least one of spraying, gas combustion, electrical arcing, plasma generation, flow shock, powder transport, or mechanical motion.

10. The system of claim 1, wherein the machine learning comprises at least one of linear discriminant analysis (LDA), quadratic discriminant analysis (QDA), K-nearest neighbors, support vector machines (SVM), regression analysis, sensitivity analysis, optimization algorithm, basinhopping, Broyden-Fletcher-Goldfarb-Shanno (BFGS), fuzzy logic, artificial neural network (ANN), or gaussian processes (GP).

11. The system of claim 1, wherein the computing system further comprises:
 an acoustic data signal processing module configured to receive the at least one time-dependent acoustic data signal; and
 an image data signal processing module configured to:
  receive the at least one image data signal, and
  transform the at least one image data signal into at least one image.

12. The system of claim 11, wherein the acoustic data signal processing module is further configured to transform the at least one time-dependent acoustic data signal to a frequency-domain spectrum, and the machine learning module is configured to determine, based on at least the plurality of control parameters, the frequency-domain spectrum, the at least one image, and the plurality of process outputs, the relationship between the plurality of control parameters and the plurality of process outputs by machine learning.

13. A method comprising:
 receiving, by a computing device, from at least one acoustic sensor, at least one time-dependent acoustic data signal indicative of sound generated by a thermal spray system controlled by a plurality of control parameters and performing a process associated with a plurality of process outputs;
 receiving, by the computing device, from at least one optical sensor, at least one image data signal indicative of the thermal spray system performing the process, wherein the at least one image data signal is real-time, near-real-time or continuous;
 transforming, by the computing device, the at least one time-dependent acoustic data signal to a frequency-domain spectrum;
 determining, by the computing device, based on at least the plurality of control parameters, the frequency-domain spectrum, the at least one image data signal, and the plurality of process outputs, a relationship between the plurality of control parameters and the plurality of process outputs by machine learning;
 determining, by the computing device, based on the relationship, respective values of the plurality of control parameters configured to cause the thermal spray system to generate predetermined values of the plurality of process outputs; and
 controlling, by the computing device, based on the respective values of the plurality of control parameters, the thermal spray system to adjust the plurality of process outputs toward a plurality of respective operating ranges by sending a control signal to thermal spray system.

14. The method of claim 13, further comprising:
selecting, by the computing device, based on the respective values of the plurality of control parameters, at least one component of the thermal spray system, wherein the at least one component is controlled by the plurality of control parameters; and
controlling, by the computing device, based on the respective values of the plurality of control parameters, the thermal spray system to adjust the plurality of process outputs toward the plurality of respective operating ranges by sending the control signal to the at least one component.

15. The method of claim 13, wherein the plurality of control parameters comprises a primary gas flow rate, a secondary gas flow rate, a gun current, a gun position, a part position, a carrier gas flow rate, a powder feed rate, a temperature, a pressure, a mass flow rate, a volumetric flow rate, a molecular flow rate, a molar flow rate, a composition, a velocity, or a concentration, or combinations thereof.

16. The method of claim 13, wherein the plurality of process outputs comprises a coating microstructure, a coating hardness, a coating adhesion, a coating deposition rate, a coating deposition efficiency, a coating quality, a coating color, or a coating density, or combinations thereof.

17. The method of claim 13, wherein the machine learning module is configured to determine, based on at least the plurality of control parameters, the frequency-domain spectrum, the at least one image, and the plurality of process outputs, at least one of a relationship between the plurality of control parameters and a plurality of measured process parameters or a relationship between the plurality of measured process parameters and the plurality of process outputs.

18. The method of claim 13, wherein the machine learning module is configured to determine the relationship between the plurality of control parameters and the plurality of process outputs by at least one of comparing real-time or near-real time respective values of the plurality of process outputs with immediately prior respective values of the plurality of process outputs, comparing real-time or near-real time respective values of the plurality of process outputs with respective values at 5%, 25%, 50%, or 75% of a present run time, or comparing real-time or near-real time respective values of the plurality of process outputs with predetermined threshold values of the plurality of process outputs.

19. The method of claim 13, wherein the computing device further comprises an output device configured to output a representation of at least one of the at least one time-dependent acoustic data signal, the frequency-domain spectrum, at least one image data signal, at least one process control parameter, at least one measured parameter, or at least one process output.

20. A non-transitory computer readable storage medium comprising instructions that, when executed, cause at least one processor to:
receive, from at least one acoustic sensor, at least one time-dependent acoustic data signal indicative of sound generated by a thermal spray system controlled by a plurality of control parameters and performing a process associated with a plurality of process outputs;
receive, from at least one optical sensor, at least one image data signal indicative of the thermal spray system performing the process, wherein the at least one image data signal is real-time, near-real-time or continuous;
transform the at least one time-dependent acoustic data signal to a frequency-domain spectrum;
determine, based on at least the plurality of control parameters, the frequency-domain spectrum, the at least one image data signal, and the plurality of process outputs, a relationship between the plurality of control parameters and the plurality of process outputs by machine learning;
determine, based on the relationship, respective values of the plurality of control parameters configured to cause the thermal spray system to generate predetermined values of the plurality of process outputs; and
control, based on the respective values of the plurality of control parameters, the thermal spray system to adjust the plurality of process outputs toward a plurality of respective operating ranges by sending a control signal to thermal spray system.

\* \* \* \* \*